US012567000B2

(12) United States Patent
Woodward et al.

(10) Patent No.: US 12,567,000 B2
(45) Date of Patent: Mar. 3, 2026

(54) SYSTEMS AND METHODS FOR SUBSCRIBER-BASED ADAPTATION OF PRODUCTION-IMPLEMENTED MACHINE LEARNING MODELS OF A SERVICE PROVIDER USING A TRAINING APPLICATION

(71) Applicant: DryvIQ, Inc., Ann Arbor, MI (US)

(72) Inventors: Steve Woodward, Canton, MI (US);
Shaun Becker, Canton, MI (US);
Stefan Larson, Dexter, MI (US)

(73) Assignee: DryvIQ, Inc., Ann Arbor, MI (US)

( * ) Notice: Subject to any disclaimer, the term of this patent is extended or adjusted under 35 U.S.C. 154(b) by 773 days.

(21) Appl. No.: 17/991,330

(22) Filed: Nov. 21, 2022

(65) Prior Publication Data

US 2023/0162088 A1 May 25, 2023

Related U.S. Application Data

(60) Provisional application No. 63/281,551, filed on Nov. 19, 2021.

(51) Int. Cl.
*G06N 20/00* (2019.01)
*G06F 18/21* (2023.01)
*G06F 18/214* (2023.01)

(52) U.S. Cl.
CPC ......... *G06N 20/00* (2019.01); *G06F 18/2155* (2023.01); *G06F 18/217* (2023.01)

(58) Field of Classification Search
CPC .... G06N 20/00; G06F 18/217; G06F 18/2155
See application file for complete search history.

(56) References Cited

U.S. PATENT DOCUMENTS

| 10,491,617 | B1 * | 11/2019 | Sadaghiani | ......... H04L 63/1425 |
|---|---|---|---|---|
| 10,666,674 | B1 * | 5/2020 | Sadaghiani | ......... H04L 63/1408 |
| 10,728,307 | B2 * | 7/2020 | Wuest | ..................... H04L 67/10 |
| 11,989,627 | B1 * | 5/2024 | Bhise | .................. G06F 18/2113 |
| 12,437,113 | B1 * | 10/2025 | Dahme | .................. G06N 20/00 |
| 2017/0124487 | A1 * | 5/2017 | Szeto | .................. G06F 11/1448 |
| 2017/0286869 | A1 * | 10/2017 | Zarosim | ................ G06N 5/025 |

(Continued)

*Primary Examiner* — Barbara M Level
(74) *Attorney, Agent, or Firm* — Padowithz Alce; Alce PLLC

(57) ABSTRACT

A system and method for accelerating an adaptation of one or more machine learning models of a data handling and governance service includes implementing a data handling and governance platform digitally accessible by a target subscriber of the data handling and governance service, wherein the data handling and governance platform interfaces with a plurality of distinct subscriber-agnostic digital content machine learning classification models of the data handling and governance service; identifying a target subscriber-agnostic digital content machine learning classification model; adapting the target subscriber-agnostic digital content machine learning classification model to a subscriber-specific digital content machine learning classification model based on a training of the target subscriber-agnostic digital content machine learning classification model with at least one training corpus comprising subscriber-specific training data samples; and implementing the subscriber-specific digital content machine learning classification model in a production mode of operation for the target subscriber.

20 Claims, 15 Drawing Sheets

200

Implementing a Training Module having a Subscriber Interface in communication with a Data Handling and Governance Service S210

Receiving (Sourcing) Raw Training Samples based on a Subscriber Training Objective S220

Labeling and Routing the Received Training Samples to a Target Training Corpus S230

Generating a Successor Model to an Incumbent Model of a Data Handling and Governance Service S240

Testing the Successor Model S250

Replacing the Incumbent Model with the Successor Model S260

(56) References Cited

U.S. PATENT DOCUMENTS

| 2018/0114100 | A1* | 4/2018 | Desai | G06V 10/454 |
| 2019/0129764 | A1* | 5/2019 | Johnson | G06F 11/3495 |
| 2020/0380417 | A1* | 12/2020 | Briancon | G06Q 30/012 |
| 2020/0387675 | A1* | 12/2020 | Nugent | G06N 3/045 |
| 2022/0067625 | A1* | 3/2022 | Jannak | G06N 20/00 |
| 2022/0100772 | A1* | 3/2022 | Kadarundalagi Raghura | |
| | | | | G06F 16/254 |
| 2022/0398462 | A1* | 12/2022 | Clement | G06N 3/09 |
| 2023/0049167 | A1* | 2/2023 | Wilson | G06V 30/19107 |
| 2024/0112011 | A1* | 4/2024 | Zappella | G06N 3/08 |
| 2025/0259144 | A1* | 8/2025 | Crabtree | G06Q 30/0601 |

* cited by examiner

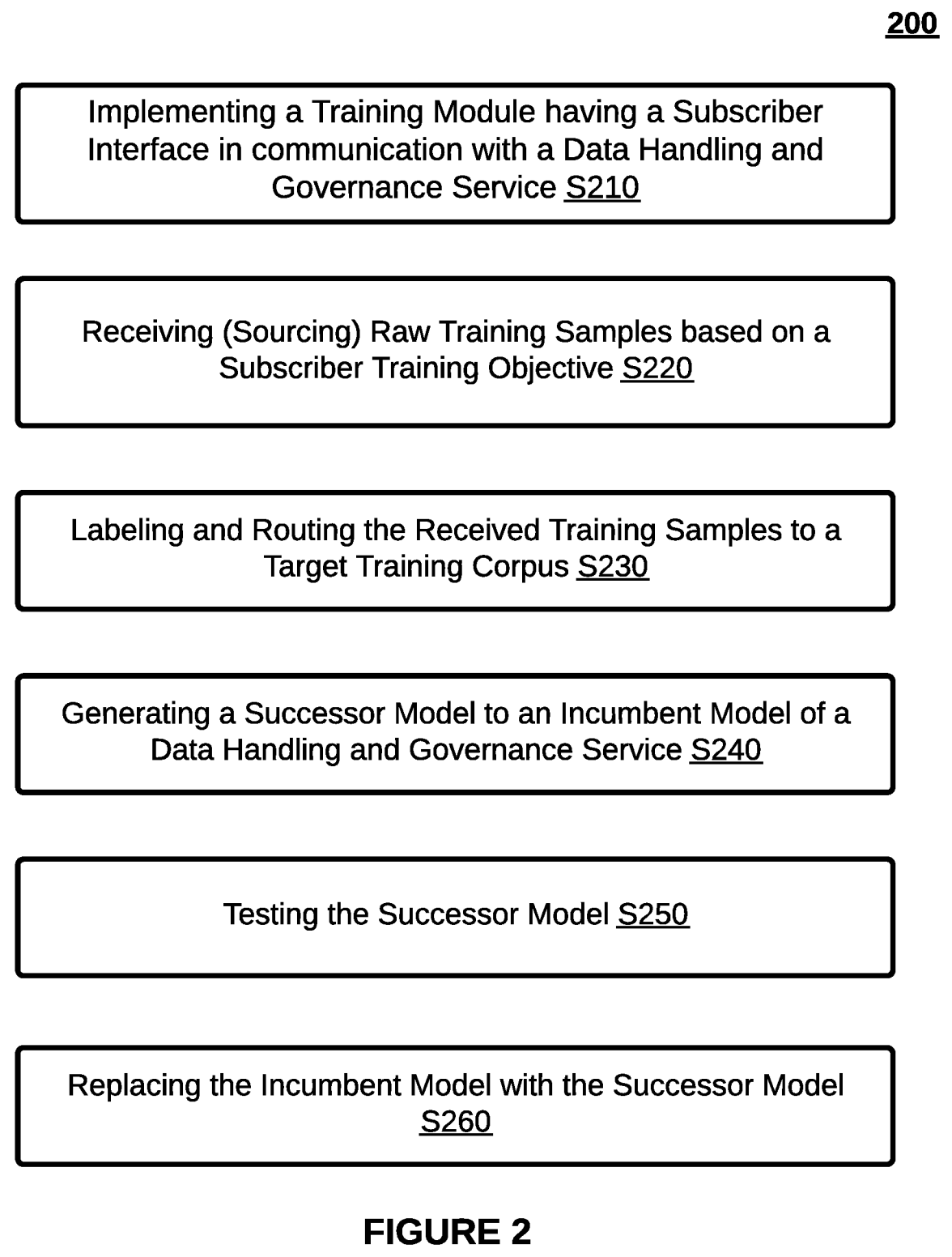

200

Implementing a Training Module having a Subscriber Interface in communication with a Data Handling and Governance Service S210

Receiving (Sourcing) Raw Training Samples based on a Subscriber Training Objective S220

Labeling and Routing the Received Training Samples to a Target Training Corpus S230

Generating a Successor Model to an Incumbent Model of a Data Handling and Governance Service S240

Testing the Successor Model S250

Replacing the Incumbent Model with the Successor Model S260

FIGURE 2

SYSTEMS AND METHODS FOR SUBSCRIBER-BASED ADAPTATION OF PRODUCTION-IMPLEMENTED MACHINE LEARNING MODELS OF A SERVICE PROVIDER USING A TRAINING APPLICATION

CROSS-REFERENCE TO RELATED APPLICATIONS

This application claims the benefit of U.S. Provisional Application No. 63/281,551, filed 19 Nov. 2021, which is incorporated in its entirety by this reference.

TECHNICAL FIELD

This invention relates generally to the data handling and data governance fields, and more specifically to new and useful systems and methods for machine learning-based classifications of data items for sensitivity-informed handling and governance in the data handling and data governance fields.

BACKGROUND

Evolving data security and data compliance risks are some of the factors that may be driving entities to take different approaches to handling their data including reorganizing their data from decentralized and often complex storage systems to centralized, cloud-based storage architectures. Additionally, misclassified digital items and unstructured digital items may further complicate attempts to successfully govern and/or manage digital items throughout any type of storage system.

In traditional on-premises data storage and nonintegrated or disjointed storage architectures, identifying data files and content that may include potentially sensitive information and further managing permissions for controlling access to files and content having high security threat and compliance risks can be especially difficult.

Thus, there are needs in the data handling and data governance fields to create improved systems and methods for intelligently handling data and providing intuitive data governance and controls that curtail the several data security and data compliance risks posed by legacy data storage and management architectures.

The embodiments of the present application described herein provide technical solutions that address, at least the needs described above.

BRIEF SUMMARY OF THE INVENTION(S)

In one embodiment, a method for accelerating an adaptation of one or more production-implemented machine learning models of a data handling and governance service includes implementing a data handling and governance platform digitally accessible by a target subscriber of the data handling and governance service, wherein the data handling and governance platform: interfaces with a plurality of distinct subscriber-agnostic digital content machine learning classification models of the data handling and governance service, and provides the target subscriber a capability of intuitively adapting each of the plurality of distinct subscriber-agnostic digital content machine learning classification models; identifying a target subscriber-agnostic digital content machine learning classification model of the plurality of distinct subscriber-agnostic digital content machine learning classification models based on one or more digital content classification objectives of the target subscriber; generating one or more model extending training corpora of subscriber-specific training data samples based on a data upload of a plurality of distinct subscriber-specific items of digital content to the data handling and governance platform; adapting the target subscriber-agnostic digital content machine learning classification model to a subscriber-specific digital content machine learning classification model based on a training of the target subscriber-agnostic digital content machine learning classification model with the one or more model extending training corpora of subscriber-specific training data samples; and replacing the target subscriber-agnostic digital content machine learning classification model with the subscriber-specific digital content machine learning classification model based on one or more efficacy metrics computed for the subscriber-specific digital content machine learning classification model satisfying one or more efficacy benchmarks.

In one embodiment, the method includes implementing the subscriber-specific digital content machine learning classification model in a production mode of operation for the target subscriber, wherein: the subscriber-specific digital content machine learning classification model operates in concert with a subset of the plurality of distinct subscriber-agnostic digital content machine learning classification models to compute one or more distinct classification inferences for inbound digital content items.

In one embodiment, the method includes wherein the target subscriber-agnostic digital content machine learning classification model is configured to classify a target piece of digital content into one of a plurality of distinct subscriber-agnostic digital content types; the one or more model extending training corpora of subscriber-specific training data samples includes a plurality of distinct labeled training data samples that correspond to a subscriber-specific digital content type distinct from the plurality of distinct subscriber-agnostic digital content types; and the subscriber-specific digital content machine learning classification model is configured to classify a subject piece of digital content into one of the plurality of distinct subscriber-agnostic digital content types and the subscriber-specific digital content type based on the training.

In one embodiment, the method includes wherein the data handling and governance platform is an intermediary between the target subscriber and the data handling and governance service that enables the target subscriber a capability of controlling each of the plurality of distinct subscriber-agnostic digital content machine learning classification models of the data handling and governance platform.

In one embodiment, the method includes wherein an algorithmic structure of the subscriber-specific digital content machine learning classification model is an extension of an algorithmic structure of the target subscriber-agnostic digital content machine learning classification model based on the training.

In one embodiment, the method includes performing a model validation of the subscriber-specific digital content machine learning classification model based on one or more testing corpora of subscriber-specific digital content items; surfacing, based on the model validation of the subscriber-specific digital content machine learning classification model, (a) a content classification inference that includes a content classification label computed by the subscriber-specific digital content machine learning classification model and (b) a representation of one of the subscriber-specific digital content items of the one or more testing corpora of subscriber-specific digital content items that corresponds to the content classification inference; receiving a content classification re-labeling request from the target subscriber to re-label the one of the subscriber-specific digital content items from the content classification label to a target content classification label; and routing the one of the subscriber-specific digital content items and the target content classification label to a training corpus associated with the subscriber-specific digital content machine learning classification model.

In one embodiment, the method includes automatically souring, via a training data search engine, a plurality of distinct training data samples based on the target content classification label; routing the plurality of distinct training data samples to the training corpus associated with the subscriber-specific digital content machine learning classification model; and performing a training of the subscriber-specific digital content machine learning classification model based on the training corpus.

In one embodiment, the method includes performing a model validation of the subscriber-specific digital content machine learning classification model based on one or more testing corpora of subscriber-specific digital content items; routing, to a digital content triage queue, (a) a subset of distinct content classification inferences computed by the subscriber-specific digital content machine learning classification model during the model validation and (b) a distinct subset subscriber-specific digital content items of the one or more testing corpora of subscriber-specific digital content items that correspond to the subset of distinct content classification inferences; and wherein each distinct content classification inference of the subset of distinct content classification inference is below an inference confidence threshold.

In one embodiment, the method includes generating one or more testing corpora of subscriber-specific testing data samples based on a subset of the plurality of distinct subscriber-specific items of digital content; performing a model validation of the target subscriber-agnostic digital content machine learning classification model based on the one or more testing corpora of subscriber-specific testing data samples; computing one or more validation efficacy metrics based on a result of the model validation of the target subscriber-agnostic digital content machine learning classification model; and wherein adapting the target subscriber-agnostic digital content machine learning classification model to a subscriber-specific digital content machine learning classification model is further based on an assessment of the one or more validation efficacy metrics against the one or more efficacy benchmarks.

In one embodiment, a method for accelerating an adaptation of one or more production-ready machine learning models of a data handling and governance service includes implementing a data handling and governance platform digitally accessible by a target subscriber of the data handling and governance service, wherein the data handling and governance platform: interfaces with a plurality of distinct subscriber-agnostic digital content machine learning classification models of the data handling and governance service, and provides the target subscriber a capability of adapting each of the plurality of distinct subscriber-agnostic digital content machine learning classification models; identifying a target subscriber-agnostic digital content machine learning classification model of the plurality of distinct subscriber-agnostic digital content machine learning classification models based on receiving, via the data handling and governance platform, an input from the target subscriber that corresponds to the target subscriber-agnostic digital content machine learning classification model; adapting the target subscriber-agnostic digital content machine learning classification model to a subscriber-specific digital content machine learning classification model based on a training of the target subscriber-agnostic digital content machine learning classification model with at least one training corpus comprising subscriber-specific training data samples; and implementing the subscriber-specific digital content machine learning classification model in a production mode of operation for the target subscriber.

In one embodiment, the method includes displaying, on a graphical user interface of the data handling and governance platform, a distinct selectable representation corresponding to each of the plurality of distinct subscriber-agnostic digital content machine learning classification models; and wherein the input from the target subscriber relates to the target subscriber selecting the distinct selectable representation that corresponds to the target subscriber-agnostic digital content machine learning classification model.

In one embodiment, the method includes in response to the identifying of the target subscriber-agnostic digital content machine learning classification model: displaying, via the data handling and governance platform, a model adaptation user interface that corresponds to the target subscriber-agnostic digital content machine learning classification model, wherein the model adaptation interface includes a digital representation of the target subscriber-agnostic digital content machine learning classification model; a digital representation of the at least one training corpus associated with the target subscriber-agnostic digital content machine learning classification model; a first selectable object that, when selected, enables the target subscriber to add one or more distinct subscriber-informed digital content types to the at least one training corpus; and a second selectable object that, when selected, executes the training of the target subscriber-agnostic digital content machine learning classification model with the at least one training corpus.

In one embodiment, the method includes based on obtaining an input from the target subscriber selecting the first selectable object of the model adaptation user interface, augmenting a corpus structure of the at least one training corpus to include a distinct subscriber-informed digital content type; and digitally mapping, via the model adaptation user interface, a plurality of distinct items of digital content of the target subscriber to the distinct subscriber-informed digital content type.

In one embodiment, the method includes wherein the target subscriber-agnostic digital content machine learning classification model is configured to classify a target piece of digital content into one of a plurality of distinct subscriber-agnostic digital content types; the method further includes: based on obtaining an input from the target subscriber selecting the second selectable object of the model adaptation user interface, executing the training of the target subscriber-agnostic digital content machine learning classification model with the at least one training corpus comprising the distinct subscriber-informed digital content type and the plurality of distinct items of digital content of the target subscriber digitally mapped to the distinct subscriber-informed digital content type, wherein: the subscriber-specific digital content machine learning classification model is configured to classify a subject piece of digital content into one of the plurality of distinct subscriber-agnostic digital content types and the distinct subscriber-informed digital content type based on the training.

In one embodiment, the method includes computing one or more efficacy metrics for the subscriber-specific digital content machine learning classification model based on the training; displaying, on a graphical user interface, a training results user interface that includes: the one or more efficacy metrics computed for the subscriber-specific digital content machine learning classification model; a first selectable object that, when selected, automatically implements the subscriber-specific digital content machine learning classification model in the production mode of operation for the target subscriber; and a second selectable object that, when selected, forgoes implementing the subscriber-specific digital content machine learning classification model in the production mode of operation for the target subscriber.

In one embodiment, the method includes wherein implementing the subscriber-specific digital content machine learning classification model in the production mode of operation for the target subscriber is based on identifying an input from the target subscriber selecting the first selectable object of the training results user interface.

In one embodiment, a computer-program product includes implementing a data handling and governance platform digitally accessible by a target subscriber of the data handling and governance service, wherein the data handling and governance platform: interfaces with a plurality of distinct subscriber-agnostic digital content machine learning classification models of the data handling and governance service, and provides the target subscriber a capability of intuitively adapting each of the plurality of distinct subscriber-agnostic digital content machine learning classification models; identifying a target subscriber-agnostic digital content machine learning classification model of the plurality of distinct subscriber-agnostic digital content machine learning classification models based on one or more subscriber-specific digital content classification objectives of the target subscriber; generating one or more training corpora of subscriber-specific training data samples based on a data upload of a plurality of distinct subscriber-specific items of digital content of the target subscriber to the data handling and governance platform; adapting the target subscriber-agnostic digital content machine learning classification model to a subscriber-specific digital content machine learning classification model based on a training of the target subscriber-agnostic digital content machine learning classification model with the one or more training corpora of subscriber-specific training data samples; and replacing the target subscriber-agnostic digital content machine learning classification model with the subscriber-specific digital content machine learning classification model based on one or more efficacy metrics computed for the subscriber-specific digital content machine learning classification model satisfying one or more efficacy benchmarks.

In one embodiment, the computer-program product includes implementing the subscriber-specific digital content machine learning classification model in a production mode of operation for the target subscriber, wherein: the subscriber-specific digital content machine learning classification model operates in concert with a subset of the plurality of distinct subscriber-agnostic digital content machine learning classification models to compute one or more distinct classification inferences for inbound digital content items.

In one embodiment, the computer-program product includes wherein the data handling and governance platform is an intermediary between the target subscriber and the data handling and governance service that enables the target subscriber a capability of controlling each of the plurality of distinct subscriber-agnostic digital content machine learning classification models of the data handling and governance platform.

In one embodiment, a method for accelerating an adaptation of one or more production-implemented machine learning models of a data handling and governance service includes implementing a data handling and governance platform digitally accessible by a target subscriber of the data handling and governance service, wherein the data handling and governance platform interfaces with one or more pre-trained subscriber-agnostic digital content machine learning classification models of the data handling and governance service, and enables a subscriber-informed adaptation of one or more of the one or more pre-trained subscriber-agnostic digital content machine learning classification models; defining an adaptation corpus of subscriber-specific training data samples based on sourcing a plurality of distinct subscriber-specific items of digital content; transforming a target pre-trained subscriber-agnostic digital content machine learning classification model of the one or more pre-trained subscriber-agnostic digital content machine learning classification models to a subscriber-specific digital content machine learning classification model based on a training of the target pre-trained subscriber-agnostic digital content machine learning classification model with the adaptation corpus of subscriber-specific training data samples; and replacing the target pre-trained subscriber-agnostic digital content machine learning classification model with the subscriber-specific digital content machine learning classification model based on one or more efficacy metrics computed for the subscriber-specific digital content machine learning classification model satisfying one or more model efficacy thresholds.

In one embodiment, the method includes implementing the subscriber-specific digital content machine learning classification model in a production mode of operation for the target subscriber, wherein: the subscriber-specific digital content machine learning classification model operates in concert with a subset of a plurality of distinct subscriber-agnostic digital content machine learning classification models to compute one or more distinct classification inferences for a corpus of unlabeled digital content items.

In one embodiment, the method includes wherein the target pre-trained subscriber-agnostic digital content machine learning classification model is configured to classify a target piece of digital content into one of a plurality of pre-trained subscriber-agnostic digital content types based on input of feature data extracted from the target piece of digital content; the adaptation corpus of subscriber-specific training data samples includes a plurality of distinct labeled training data samples that correspond to a subscriber-specific digital content type distinct from the plurality of pre-trained subscriber-agnostic digital content types; and the subscriber-specific digital content machine learning classification model is configured to classify a subject piece of digital content into one of the plurality of pre-trained subscriber-agnostic digital content types and the subscriber-specific digital content type based on the training.

In one embodiment, the method includes wherein the data handling and governance platform is an intermediary between the target subscriber and the data handling and governance service that enables the target subscriber a capability of controlling each of the one or more pre-trained subscriber-agnostic digital content machine learning classification models of the data handling and governance platform.

In one embodiment, the method includes wherein an algorithmic structure of the subscriber-specific digital content machine learning classification model is an extension of an algorithmic structure of the target pre-trained subscriber-agnostic digital content machine learning classification model based on the training.

In one embodiment, the method includes performing a model validation of the subscriber-specific digital content machine learning classification model based on one or more testing corpora of subscriber-specific digital content items; surfacing, based on the model validation of the subscriber-specific digital content machine learning classification model, (a) a content classification inference that includes a content classification label computed by the subscriber-specific digital content machine learning classification model and (b) a representation of one of the subscriber-specific digital content items of the one or more testing corpora of subscriber-specific digital content items that corresponds to the content classification inference; receiving a content classification re-labeling request from the target subscriber to re-label the one of the subscriber-specific digital content items from the content classification label to a target content classification label; and routing the one of the subscriber-specific digital content items and the target content classification label to a training corpus associated with the subscriber-specific digital content machine learning classification model.

In one embodiment, the method includes automatically souring, via a training data search engine, a plurality of distinct training data samples based on the target content classification label; routing the plurality of distinct training data samples to the training corpus associated with the subscriber-specific digital content machine learning classification model; and performing a training of the subscriber-specific digital content machine learning classification model based on the training corpus.

In one embodiment, the method includes performing a model validation of the subscriber-specific digital content machine learning classification model based on one or more testing corpora of subscriber-specific digital content items; routing, to a digital content triage queue, (a) a subset of distinct content classification inferences computed by the subscriber-specific digital content machine learning classification model during the model validation and (b) a distinct subset of subscriber-specific digital content items of the one or more testing corpora of subscriber-specific digital content items that correspond to the subset of distinct content classification inferences; and wherein each distinct content classification inference of the subset of distinct content classification inferences is below an inference confidence threshold.

In one embodiment, the method includes generating one or more testing corpora of subscriber-specific testing data samples based on a subset of the adaptation corpus of subscriber-specific training data samples; performing a model validation of the target pre-trained subscriber-agnostic digital content machine learning classification model based on the one or more testing corpora of subscriber-specific testing data samples; computing one or more validation efficacy metrics based on a result of the model validation of the target pre-trained subscriber-agnostic digital content machine learning classification model; and wherein transforming the target pre-trained subscriber-agnostic digital content machine learning classification model to a subscriber-specific digital content machine learning classification model is further based on an assessment of the one or more validation efficacy metrics against the one or more model efficacy thresholds.

In one embodiment, a method for accelerating an adaptation of one or more pre-trained machine learning models of a data handling and governance service includes implementing a data handling and governance platform digitally accessible by a target subscriber of the data handling and governance service, wherein the data handling and governance platform: interfaces with a plurality of distinct pre-trained subscriber-agnostic digital content machine learning classification models of the data handling and governance service, and enables the target subscriber a capability of adapting each of the plurality of distinct pre-trained subscriber-agnostic digital content machine learning classification models; identifying a target pre-trained subscriber-agnostic digital content machine learning classification model of the plurality of distinct pre-trained subscriber-agnostic digital content machine learning classification models based on receiving, via the data handling and governance platform, an input from the target subscriber that corresponds to the target pre-trained subscriber-agnostic digital content machine learning classification model; adapting the target pre-trained subscriber-agnostic digital content machine learning classification model to a subscriber-specific digital content machine learning classification model based on a training of the target pre-trained subscriber-agnostic digital content machine learning classification model with at least one training corpus comprising subscriber-specific training data samples; and implementing the subscriber-specific digital content machine learning classification model in a production mode of operation for the target subscriber.

In one embodiment, the method includes displaying, on a graphical user interface of the data handling and governance platform, a distinct selectable representation corresponding to each of the plurality of distinct pre-trained subscriber-agnostic digital content machine learning classification models; and wherein: the input from the target subscriber relates to the target subscriber selecting the distinct selectable representation that corresponds to the target pre-trained subscriber-agnostic digital content machine learning classification model.

In one embodiment, the method includes in response to the identifying of the target pre-trained subscriber-agnostic digital content machine learning classification model: displaying, via the data handling and governance platform, a model adaptation user interface that corresponds to the target pre-trained subscriber-agnostic digital content machine learning classification model, wherein the model adaptation interface includes a digital representation of the target pre-trained subscriber-agnostic digital content machine learning classification model; a digital representation of the at least one training corpus associated with the target pre-trained subscriber-agnostic digital content machine learning classification model; a first selectable object that, when selected, enables the target subscriber to add one or more distinct subscriber-informed digital content types to the at least one training corpus; and a second selectable object that, when selected, executes the training of the target pre-trained subscriber-agnostic digital content machine learning classification model with the at least one training corpus.

In one embodiment, the method includes based on obtaining an input from the target subscriber selecting the first selectable object of the model adaptation user interface, augmenting a corpus structure of the at least one training corpus to include a distinct subscriber-informed digital content type; and digitally mapping, via the model adaptation user interface, a plurality of distinct items of digital content of the target subscriber to the distinct subscriber-informed digital content type.

In one embodiment, the method includes wherein the target pre-trained subscriber-agnostic digital content machine learning classification model is configured to classify a target piece of digital content into one or more pre-trained subscriber-agnostic digital content types based on feature data extracted from the target piece of digital content; the method further includes: based on obtaining an input from the target subscriber selecting the second selectable object of the model adaptation user interface, executing the training of the target pre-trained subscriber-agnostic digital content machine learning classification model with the at least one training corpus comprising the distinct subscriber-informed digital content type and the plurality of distinct items of digital content of the target subscriber digitally mapped to the distinct subscriber-informed digital content type, wherein: the subscriber-specific digital content machine learning classification model is configured to classify a subject piece of digital content into one or more of the one or more pre-trained subscriber-agnostic digital content types and the distinct subscriber-informed digital content type based on the training.

In one embodiment, the method includes computing one or more efficacy metrics for the subscriber-specific digital content machine learning classification model based on the training; displaying, on a graphical user interface, a training results user interface that includes: the one or more efficacy metrics computed for the subscriber-specific digital content machine learning classification model; a first selectable object that, when selected, automatically implements the subscriber-specific digital content machine learning classification model in the production mode of operation for the target subscriber; and a second selectable object that, when selected, forgoes implementing the subscriber-specific digital content machine learning classification model in the production mode of operation for the target subscriber.

In one embodiment, the method includes wherein implementing the subscriber-specific digital content machine learning classification model in the production mode of operation for the target subscriber is based on identifying an input from the target subscriber selecting the first selectable object of the training results user interface.

In one embodiment, a computer program product includes implementing a data handling and governance platform digitally accessible by a target subscriber of the data handling and governance service, wherein the data handling and governance platform interfaces with a plurality of distinct pre-trained subscriber-agnostic digital content machine learning classification models of the data handling and governance service, and enables a subscriber-informed adaptation of one or more of the plurality of distinct pre-trained subscriber-agnostic digital content machine learning classification models; defining an adaptation corpus of subscriber-specific training data samples based on sourcing a plurality of distinct subscriber-specific items of digital content; transforming a target pre-trained subscriber-agnostic digital content machine learning classification model of the plurality of distinct pre-trained subscriber-agnostic digital content machine learning classification models to a subscriber-specific digital content machine learning classification model based on a training of the target subscriber-agnostic digital content machine learning classification model with the adaptation corpus of subscriber-specific training data samples; and replacing the target pre-trained subscriber-agnostic digital content machine learning classification model with the subscriber-specific digital content machine learning classification model based on one or more efficacy metrics computed for the subscriber-specific digital content machine learning classification model satisfying one or more model efficacy thresholds.

In one embodiment, the computer program product includes sourcing a plurality of distinct adaptation corpora of subscriber-specific training data samples; assigning each distinct adaptation corpus of the plurality of distinct adaptation corpora to a training of a distinct subscriber-agnostic model of the plurality of distinct pre-trained subscriber-agnostic digital content machine learning classification models, wherein each of the plurality of distinct pre-trained subscriber-agnostic digital content machine learning classification models produces a distinct content classification inference; and transforming each distinct subscriber-agnostic model to a distinct subscriber-specific model based on executing the training of each distinct subscriber-agnostic model.

BRIEF DESCRIPTION OF THE FIGURES

FIG. 2 illustrates an example method 200 in accordance with one or more embodiments of the present application;

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System for Intelligent Content Handling and Content Governance

Figure 1:
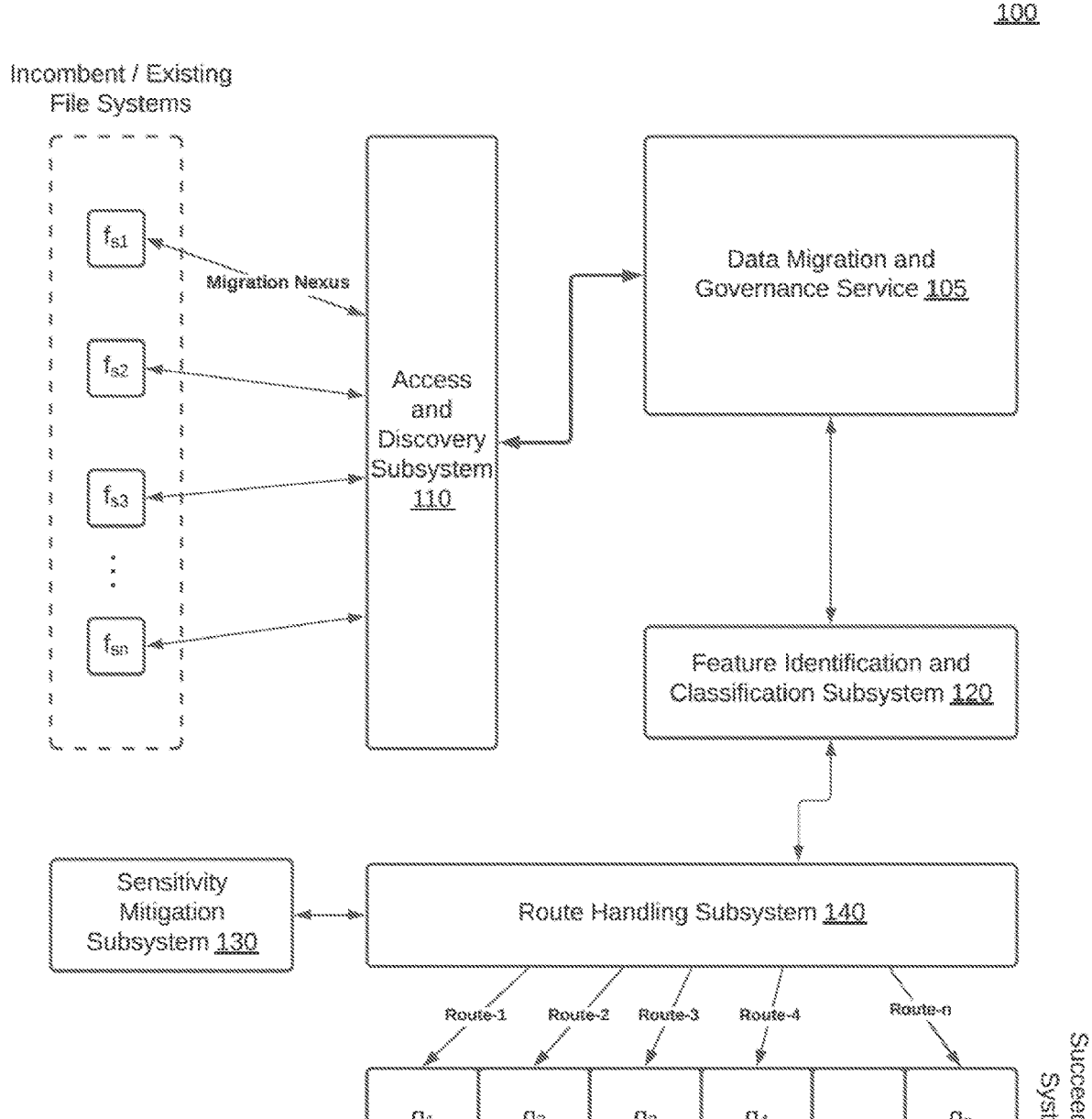
FIG. 1 illustrates a schematic representation of a system 100 in accordance with one or more embodiments of the present application.

As shown in FIG. 1, a system 100 for intelligent data handling and data governance includes a data handling and governance service 105, an access and discovery subsystem 110, a feature identification and classification subsystem 120, a sensitivity mitigation subsystem 130, and a content route handling subsystem 140, as described in U.S. Patent Application No. 63/215,203, which is incorporated herein in its entirety by this reference. The system 100 may sometimes be referred to herein as an intelligent data handling and data governance system 100 or simply the data handling system 100.

1.05 Intelligent Content Access+Content Handling Subsystem

The data handling and governance service 105, sometimes referred to herein as the "data handling service 105" may be implemented by a distributed network of computers and may be in operable and control communication with each of the subsystems of the system 100. That is, the data handling service 105 may include a centralized controlling computer server(s) and associated computing systems that encourages and/or controls the intelligent data handling, data classification, and data governance operations of each of the subsystems 110-140.

In one or more embodiments, the data handling service 105 may function to implement a data handling and data governance application programming interface (API) that enables programmatic communication and control between the data handling system 100 and the one or more sub-services therein and APIs of the one or more subscribers to the data handling service 105 of the data handling system 100.

1.1 Content Access+Discovery Subsystem

The access and discovery subsystem 110, which may be sometimes referred to herein as the "discovery subsystem" or "discovery subservice", preferably functions to enable one or more electronic connections between the data handling system 100 and one or more external systems of one or more subscribers to the data handling service 105. The discovery subsystem may include one or more access modules that may function to establish or create content communication channels, which are sometimes referred to as "migration *nexus*" or "data handling *nexus*", between the data handling system 100 and subscriber systems. In one or more embodiments, the data handling *nexus* may include any suitable medium and/or method of transmitting digital items between at least two devices including, but not limited to, a service bus, a digital communication channel or line, and/or the like.

Figure 4:
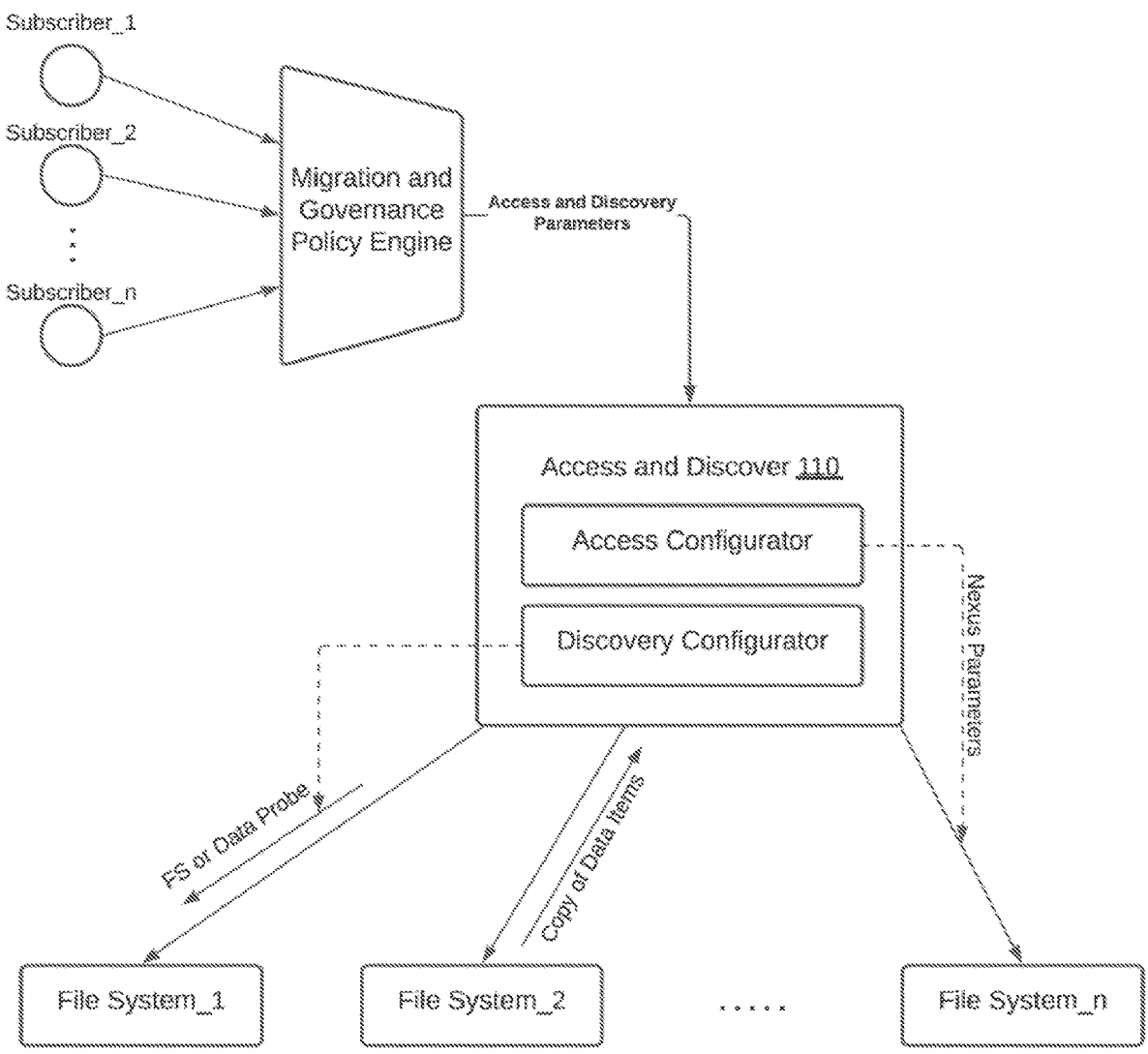
FIG. 4 illustrates a schematic representation of a second implementation of one or more sub-components of the system 100 in accordance with one or more embodiments of the present application.

The discovery subsystem 100 may additionally or alternatively include one or more discovery submodules that perform one or more content discovery actions and/or functions for identifying existing file and content systems within a computing architecture of a subscriber, as shown generally by way of example in FIG. 4.

1.2 Content Feature Identification and Classification Subsystem

Figure 5:
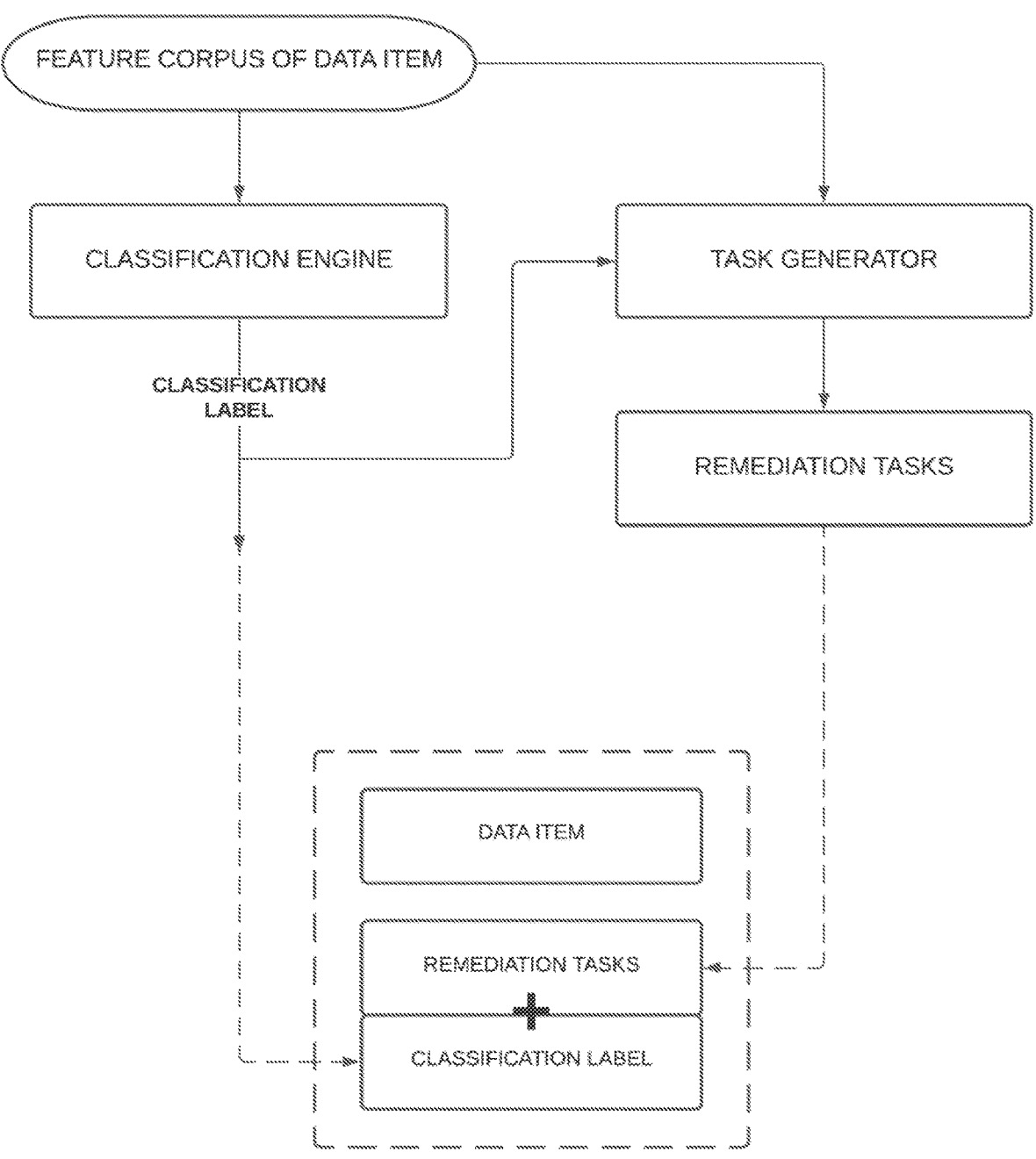
FIG. 5 illustrates a schematic representation of an example for generating action tasks for a data item in accordance with one or more embodiments of the present application.
Figure 6:
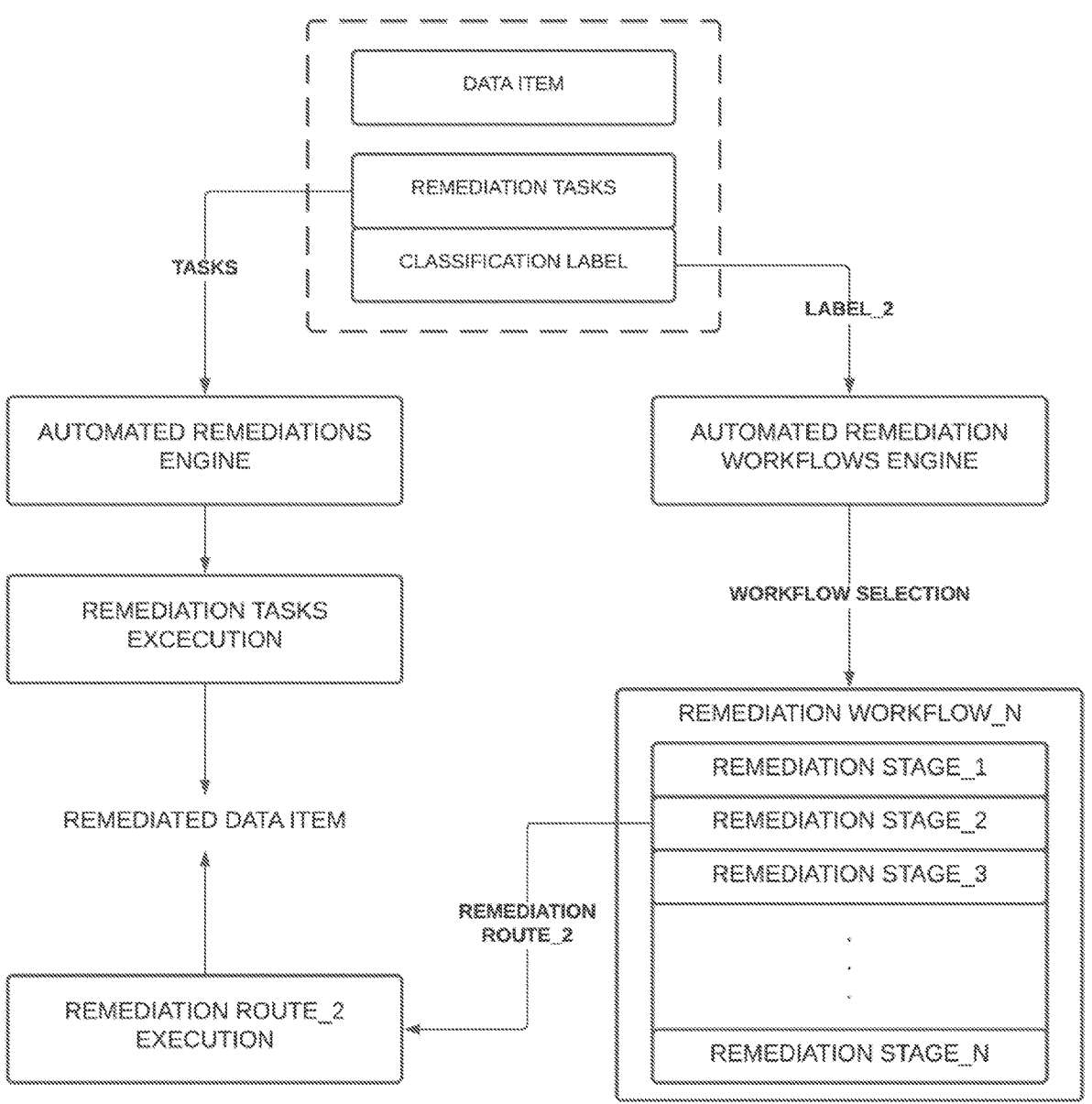
FIG. 6 illustrates a schematic representation of an example for implementing a remediation stage for handling a data item in accordance with one or more embodiments of the present application.

The feature identification and classification subsystem 120, which may sometimes be referred to herein as a "classification subsystem", preferably functions to compute one or more classification labels for each target file or target content being migrated and/or handled by the data handling system 100, as shown generally by way of example in FIG. 5 and FIG. 6.

Figure 3:
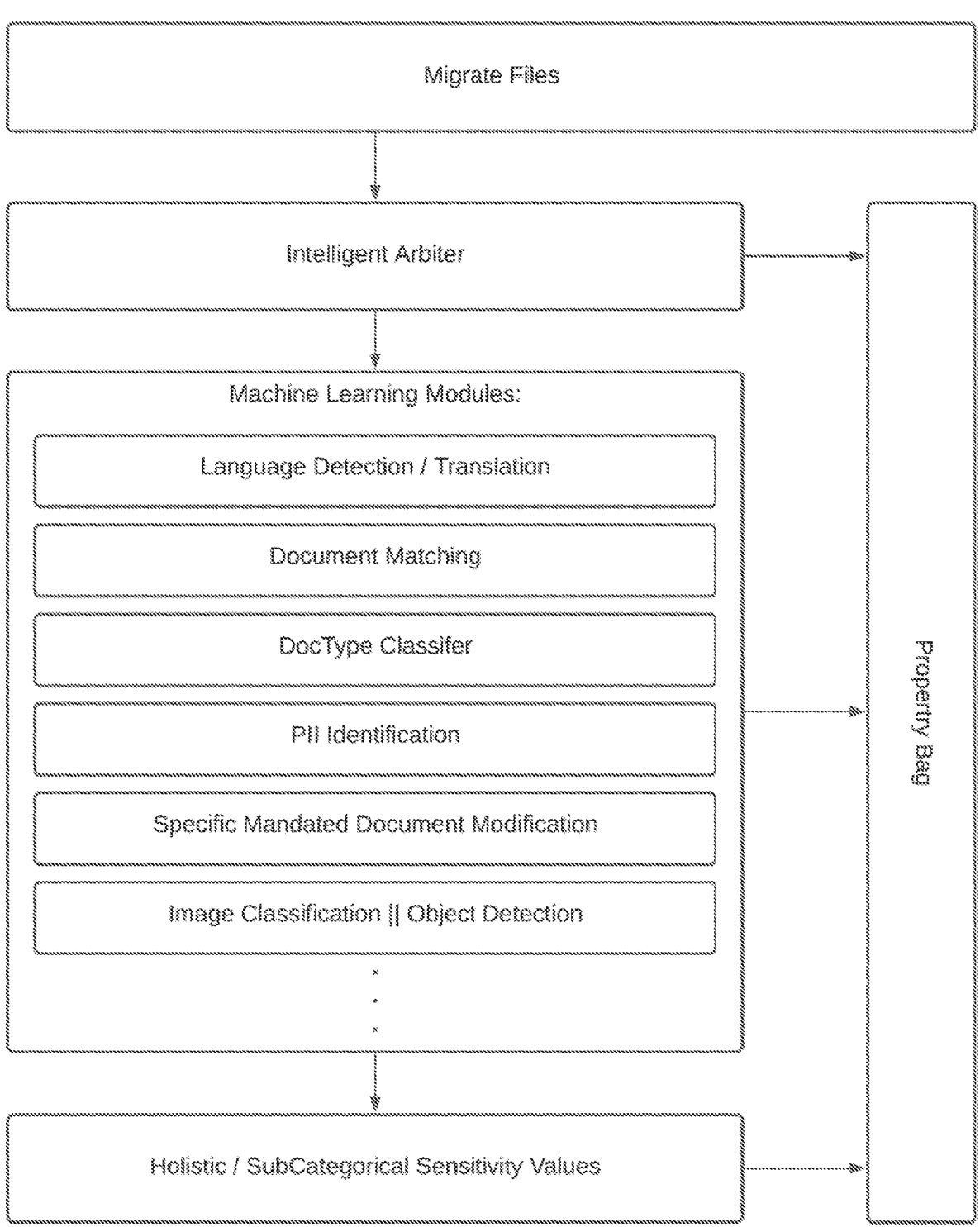
FIG. 3 illustrates a schematic representation of a first implementation of one or more sub-components of the system 100 in accordance with one or more embodiments of the present application.

In one or more embodiments, the classification subsystem 120 includes a machine learning module or subsystem that may be intelligently configured to predict various classifications for each target file or target document including, but not limited to, identifying a document type, identifying sensitive information, identifying a document's language (e.g., via a language detection model), identifying objects or images, identifying document form values, and/or the like. In such embodiments, the classification subsystem 100 may include a plurality of distinct machine learning-based classification submodules, which may be outlined herein below in the method 200 and as shown generally by way of example in FIG. 3.

Additionally, or alternatively, in some embodiments, the classification subsystem 100 may include one or more content classification modules that include extensible classification heuristics derived from one or more of subscriber-defined content policy and/or data handling service-derived content policy.

Additionally, or alternatively, the classification subsystem 100 may implement one or more ensembles of trained machine learning models. The one or more ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a machine learning classifier, computer vision model, convolutional neural network (e.g., ResNet), visual transformer model (e.g., ViT), object detection model (e.g., R-CNN, YOLO, etc.), regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a semantic image segmentation model, an image instance segmentation model, a panoptic segmentation model, a keypoint detection model, a person segmentation model, an image captioning model, a 3D reconstruction model, a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation from transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, MobileBERT, TinyBERT, GPT, GPT-2, GPT-3, GPT-4 (and all subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

1.3 Content Sensitivity Mitigation Subsystem

Figure 7:
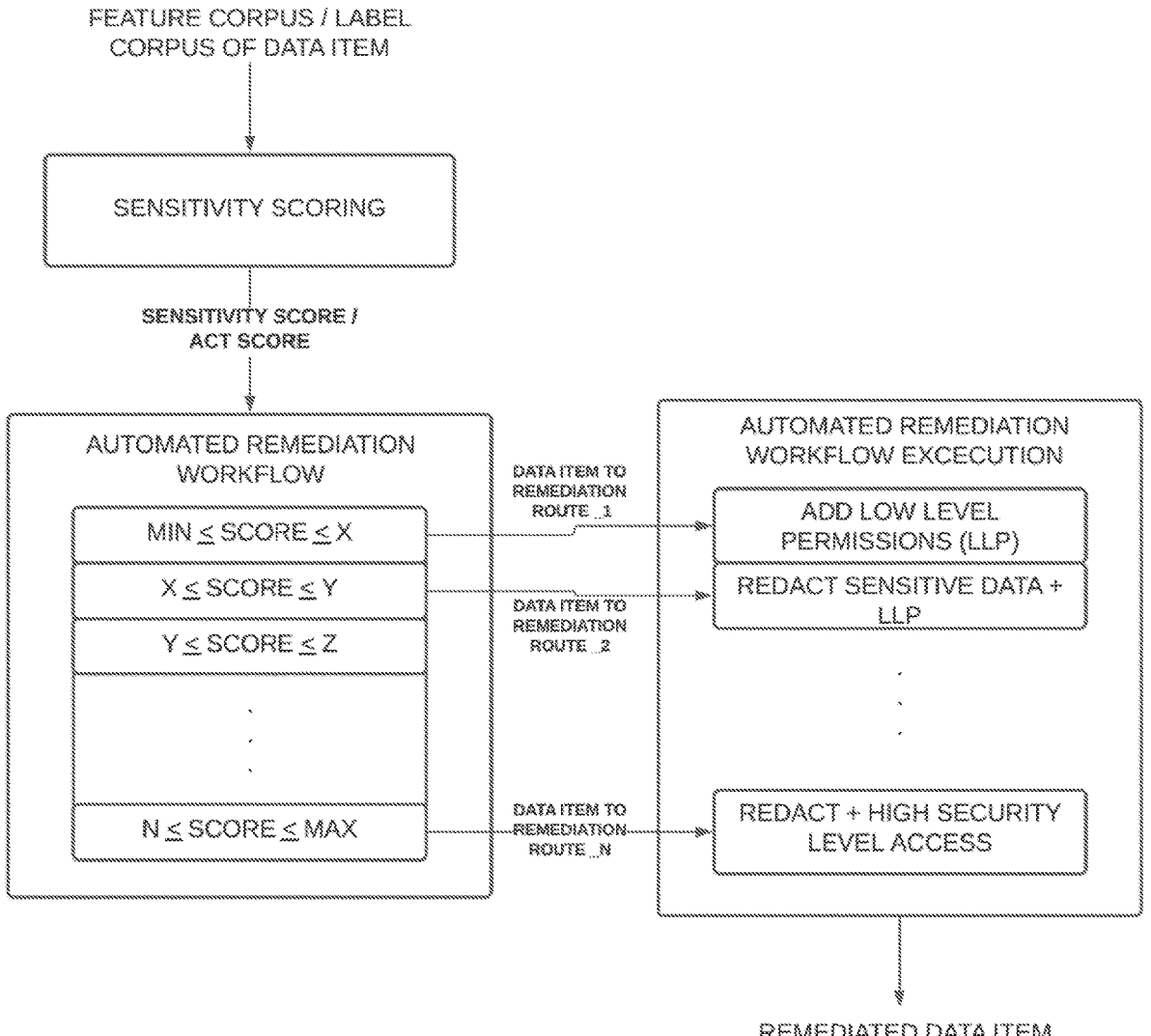
FIG. 7 illustrates a schematic representation of an example of implementing a sensitivity evaluation stage for handling a data item in accordance with one or more embodiments of the present application.

The sensitivity mitigation subsystem 130 preferably functions to perform one or more automated actions that reduces a sensitivity of a target file or target content or otherwise, improves a security of a target file or target content for protecting sensitive or secure content/information, as shown generally by way of example in FIG. 7. Sensitive information or data preferably relate to data that must be guarded from unauthorized access and unwarranted disclosure to maintain the information security of an individual or an organization. In one or more embodiments, sensitive information may be defined based on subscriber information security policy or file system policy. In some embodiments, sensitive information may be defined based on data handling service-defined file system policy.

The sensitivity mitigation subsystem 130 may include a plurality of distinct automated sensitivity mitigation workflows or the like to which a target file or target content may be intelligently routed based on classification data.

1.4 Automated Document Identification Module

The content route handling subsystem 140 preferably functions to intelligently route each target file or target content based on classification inferences or predictions of the classification subsystem 120. In some embodiments, a succeeding or new file system of a subscriber may include a predetermined configuration for ingesting and/or storing target digital items and content. In such embodiments, the content route handling subsystem 140 may be configured based on the storage parameters and/or configurations of the succeeding file system(s) and perform a routing of target files and target content to appropriate regions or partitions of the succeeding file system(s).

Additionally, or alternatively, the content route handling subsystem 140 may function to route distinct target files and/or target content to the sensitivity mitigation subsystem 130 based on the one or more features discovered and classifications of the classification subsystem 120.

1.5 Automated Training Sample Sourcing Subsystem

Figure 8:
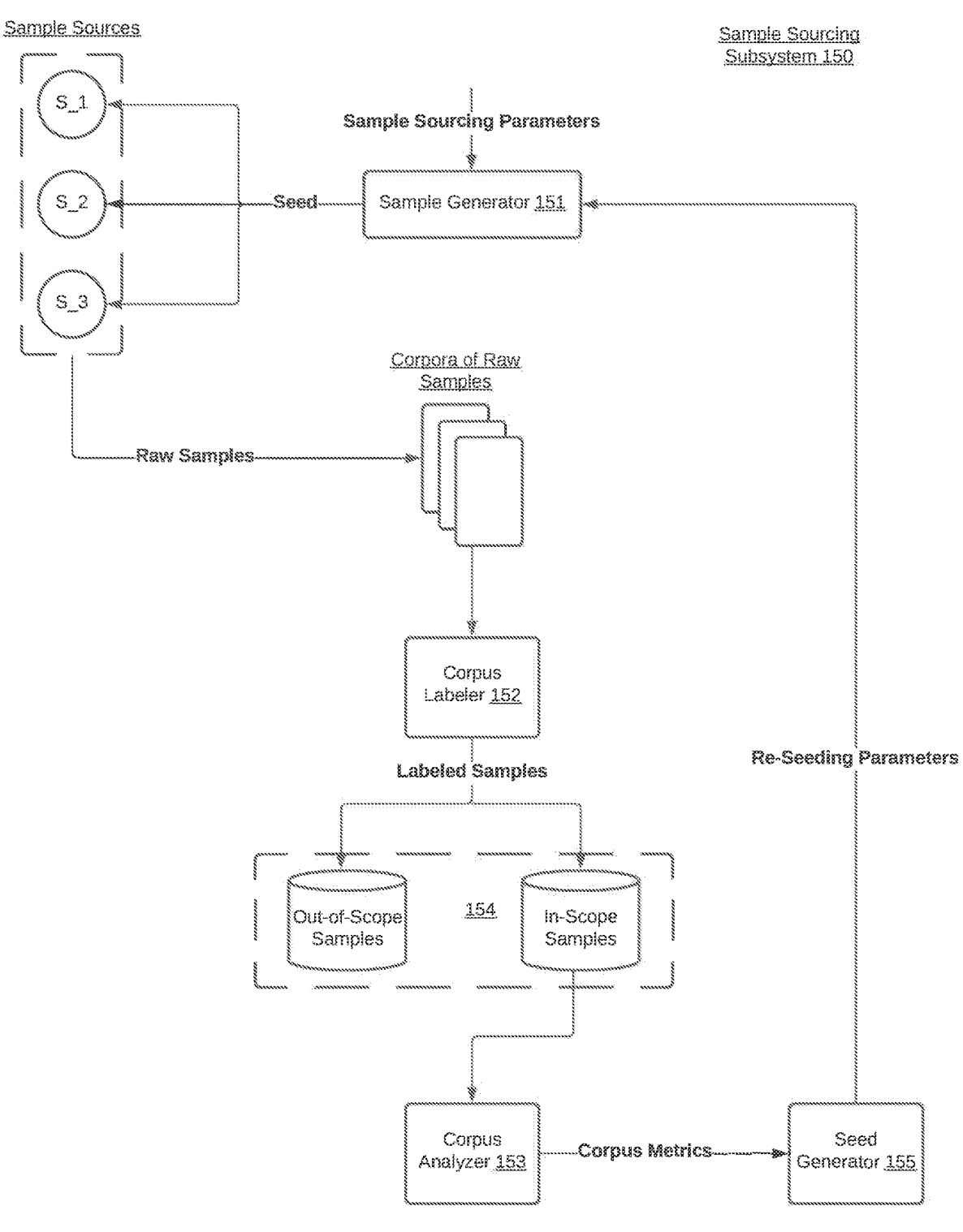
FIG. 8 illustrates a schematic representation of an example of a sample sourcing subsystem of the system 100 in accordance with one or more embodiments of the present application.

The automated training sample sourcing subsystem 150 preferably includes a document-image generator interface 151, a corpus annotations module 152, a training corpus analyzer (module) 153, one or more training sample repositories 154, and/or a seed/re-seed generator 155, as shown by way of example in FIG. 8. In a preferred embodiment, the automated training sample sourcing subsystem 150 may function to source document and/or image training data samples via a document-image generator 151 that may be in operable communication with a plurality of sources of training data samples. In a preferred embodiment, the document-image generator 151 may be seeded with sourcing parameters that may be used in generating requests for document and/or image training data sources to various of the plurality of sources of training data samples.

It shall be recognized that the document-image generator interface 151 may be interchangeably referred to herein as an image generator interface and may be additionally configured for sourcing corpora of image samples. It shall also be recognized that while in the description provided herein reference is preferably made to a sourcing and handling of document samples, the sourcing and handling of image samples should also be implied in each instance when not expressly described or mentioned.

The corpus annotations module 152 preferably functions to ingest a corpus of unlabeled document samples or image samples and compute classification labels and/or annotations for each distinct sample within a target corpus of document samples.

The training corpus analyzer (module) 153 preferably functions to evaluate one or more attributes of a corpus of document samples or image samples being sourced for training a target machine learning model. In one or more embodiments, the training corpus analyzer 153 may be configured to automatically compute one or more corpus metrics that indicate a likely level of efficacy of a target corpus of training data samples for potentially training a target machine learning model on a specific task.

The one or more training sample repositories 154 may function to store the corpus of labeled document samples. In a preferred embodiment, the one or more training sample repositories may be bifurcated into two distinct repositories in which a first repository may function to store in-scope labeled document samples and a second repository may function to store out-of-scope labeled document samples.

The seed/re-seed generator 155 may function to generate one or more document sourcing parameters for sourcing one or more corpora of document samples from a plurality of distinct sources of document samples. In some embodiments, the re-seed generator 155 may function to generate re-seeding sourcing parameters based on an evaluate of a pending corpus of document samples. That is, calculated corpus metrics and/or identified corpus deficiencies may inform a derivation of one or more seed sourcing parameters for a continued creation or build out of one or more corpus of document or image samples.

2. Methods for Subscriber-Based Adaptation of Production-Implemented Digital Content Machine Learning Classification Models of a Service Provider Using a Training Application As shown in FIG. 2, a method 200 for subscriber-based tuning of one or more production-implemented digital content machine learning classification models of a service provider includes implementing a training module having a subscriber interface in communication with a data handling and governance service (e.g., system/service 100) S210, receiving or sourcing raw training data samples based on one or more subscriber training objectives S220, labeling and routing the received or sourced training data samples to a target training corpus S230, generating a successor digital content machine learning classification model to an incumbent digital content machine learning classification model of the data handling and governance service S240, testing the successor digital content machine learning classification model S250, and replacing the incumbent digital content machine learning classification model with the successor digital content machine learning classification model S260.

2.10 Implementing a Training Module

S210, which includes implementing a training module, may function to implement a training module having a subscriber interface that may provide a target subscriber a capability of creating, extending, tuning, and/or replacing one or more incumbent (machine learning-based) models of a data handling and governance service. An incumbent machine learning model, as generally referred to herein, may be a production-implemented or production-ready machine learning classification/inference model designed and trained to predict a file or a content classification or type based on an input of a corpus of feature vectors associated with a target file or target content. In one or more embodiments, during an implementation of the method 200, a subscriber interfacing with a training module (e.g., a data handling and governance platform or the like) may function to adapt a subscriber-agnostic digital content machine learning classification model into a subscriber-specific digital content machine learning classification model.

In one or more embodiments, a training module may interface with a plurality of distinct machine learning building and/or training stages including, but not limited to, a training data curation/sourcing module or stage, a machine learning training module, a machine learning testing module, and/or a machine learning deployment module (e.g., replacement of a target incumbent model with a successor model). Stated differently, a subscriber interfacing with a training module (e.g., a data handling and governance platform) may use one or more of the plurality of distinct machine learning building and/or training stages to adapt, tune, and/or replace one or more production-implemented incumbent models and/or one or more subscriber-agnostic digital content machine learning classification models of the data handling and governance service.

In one or more embodiments, a target subscriber to a data handling and governance service may preferably function to retrain and replace one or more incumbent models (e.g., subscriber-agnostic digital content machine learning classification models) of the data handling and governance service through one or more subscriber inputs or a sequence of subscriber inputs directed to a subscriber interface of the training module. In other words, a service provider may allow subscribers (to the data handling and governance service) a capability of modifying, tuning, and/or extending one or more default or out-of-the-box machine learning models (e.g., subscriber-agnostic digital content machine learning classification models, incumbent models, or the like) originally designed and trained by the service provider to satisfy one or more subscriber preferences or objectives to how the service may predict, function, and/or respond to digital content classification requests.

It shall be noted that, in one or more embodiments, S210 may function to implement a data handling and governance platform (e.g., a training module or the like) that may be accessible by a target subscriber of the data handling and governance service. In such embodiments, the data handling and governance platform may interface with a plurality of distinct subscriber-agnostic digital content machine learning classification models of the data handling and governance service to provide the target subscriber a capability of intuitively adapting each of the plurality of distinct subscriber-agnostic digital content machine learning classification model through a no-code interface or the like.

Subscriber Interface

As briefly mentioned above, subscribers to the data handling and governance service may interact/interface with the subscriber interface of the training module (e.g., data handling and governance platform or the like). The subscriber interface of the training module may be designed to enable subscribing users, who may have limited-to-no experience in constructing and/or training machine learning models to intuitively scale, train, and/or re-train enterprise-level machine learning models (e.g., pre-trained subscriber agnostic incumbent models) to perform subscriber-specific classification tasks (e.g., digital content classification tasks defined by a subscriber or the like).

Additionally, or alternatively, the subscriber interface of the training module may include one or more training data curation and/or model training tools that enable an administrator or subscribing user to perform training data processing or training data curation tasks such as manually or semi-manually creating one or more corpora of training data, labeling or re-labeling training data samples, annotating training data samples, and/or the like. Accordingly, in one or more non-limiting examples, using one or more training data curation tools of the subscriber interface, such as a training sample annotation feature, interface, or tool, a subscribing user may selectively annotate one or more training data samples of a training corpus prior to training a target model with the training corpus.

In one or more embodiments, a subscriber may function to retrain and/or replace a target incumbent model (e.g., subscriber-agnostic digital content machine learning classification model or the like) through the training module based on a training objective and/or one or more parameters of a training objective. For instance, in a non-limiting example, the system and/or service implementing the method 200 may receive a training objective in response to subscriber input of a distinct and/or specific machine learning-based task or objective and/or distinct sourcing parameters. In other words, one or more subscriber inputs to the subscriber interface may inform the parameters of an action or request or objective to be performed by the training module (e.g., data handling and governance platform).

Additionally, or alternatively, the subscriber interface of the training module may have a plurality of distinct user interface objects that may be selectable and in response to a detection of a subscriber selecting a user interface object or a sequence of user interface objects, the system or service implementing the method 200 may detect one or more training objectives of the subscriber.

Figure 9:
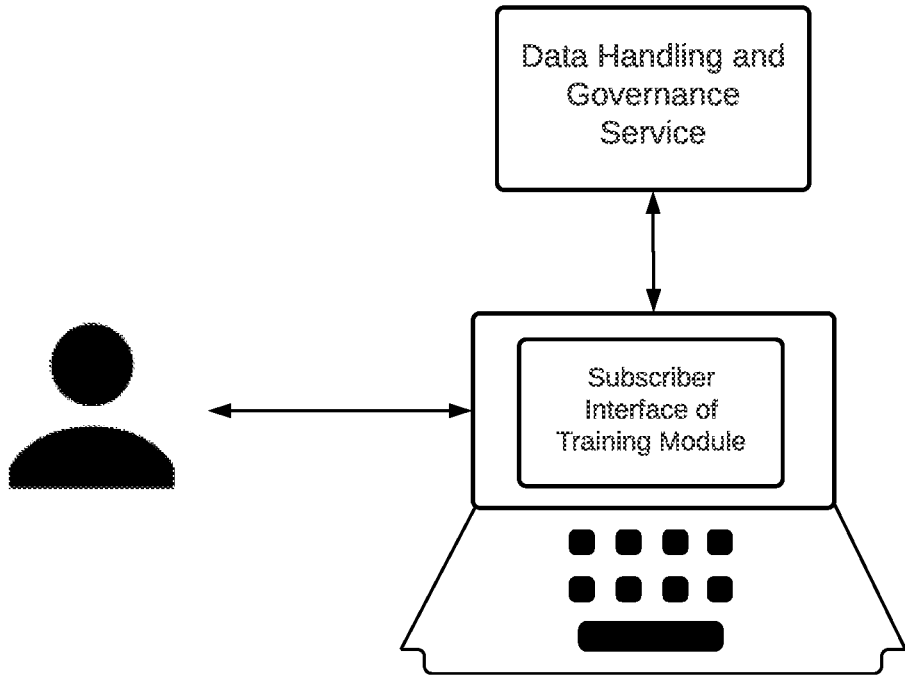
FIG. 9 illustrates a schematic representation of a subscriber interacting with a subscriber interface of a training module in accordance with one or more embodiments of the present application.

It shall be noted that, in one or more embodiments, the training module may be accessible to one or more target subscribers via any type of web-based medium. For instance, a subscriber to a data handling and governance service may function to communicate or interact with the subscriber interface of the training module via a web-based application, as shown generally by way of example in FIG. 9.

Figure 11:
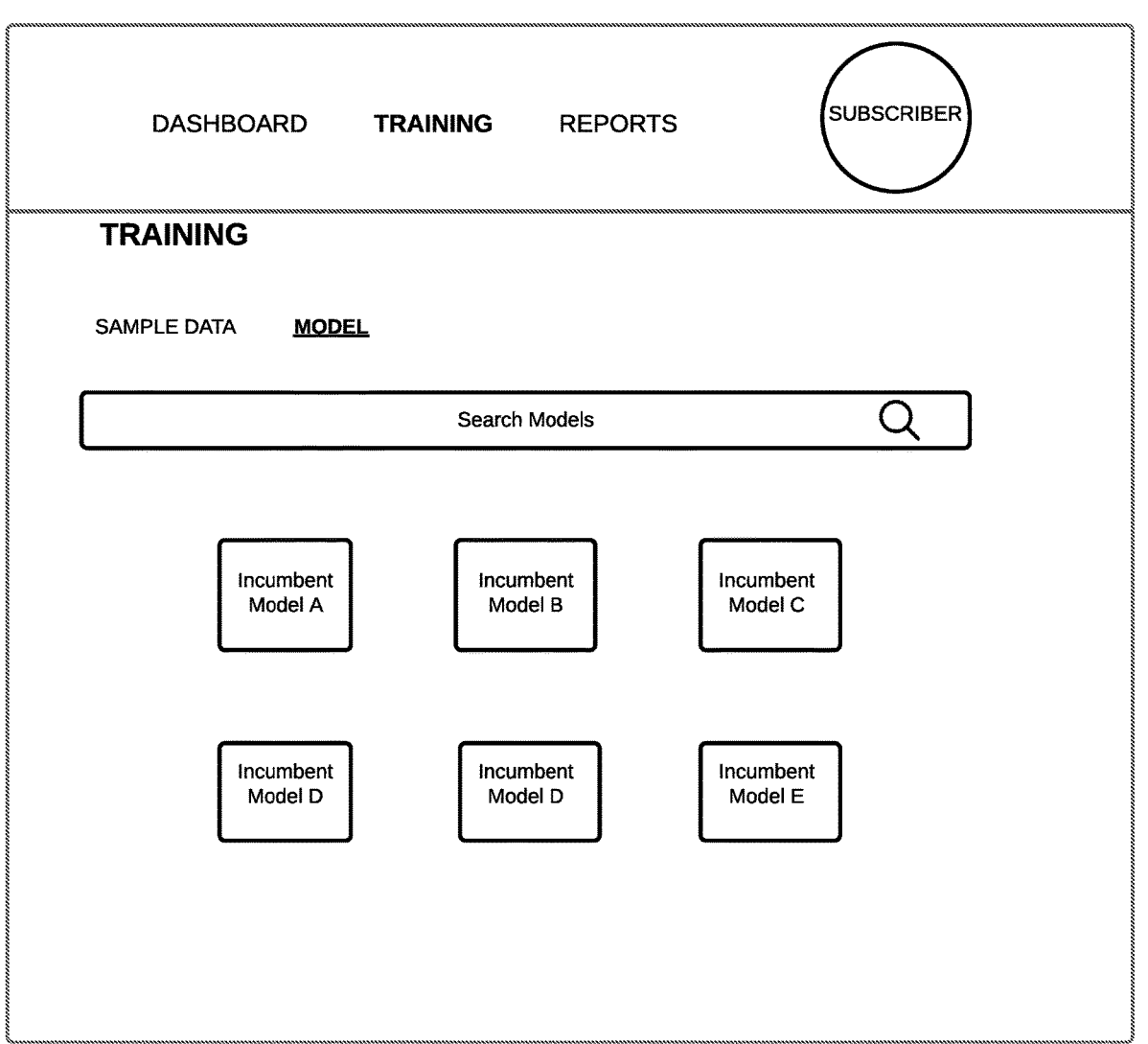
FIG. 11 illustrates an example representation of a plurality of distinct incumbent models of a data handling and governance service accessible to a training module in accordance with one or more embodiments of the present application.

Incumbent Model Types I Subscriber-Agnostic Digital Content Machine Learning Classification Model Types In one or more embodiments, a plurality of incumbent digital content machine learning-based classification models may underlie a data handling and governance service and may be in digital communication with the training module or the data handling and governance platform, as shown generally by way of example in FIG. 11. For instance, in a non-limiting example, a data handling and governance service may include, but not be limited to, one or more of a document machine learning classifier, a machine learning-based file name classifier, an out-of-scope document classifier, a personally identifiable information (PII) classifier, a document identification classifier, a language machine learning classifier, and/or an image classifier, as described in U.S. patent application Ser. No. 17/849,555, filed on 24 Jun. 2022, titled SYSTEMS AND METHODS FOR INTELLIGENT DIGITAL ITEM DISCOVERY AND MACHINE LEARNING-INFORMED HANDLING OF DIGITAL ITEMS AND DIGITAL ITEM GOVERNANCE, which is incorporated herein in its entirety by this reference. It shall be noted that each of the above-mentioned machine learning-based models (e.g., subscriber-agnostic digital content machine learning classification models) may be adapted or tuned (by a subscriber) for a subscriber-specific digital content classification purpose via the training module.

At least one technical advantage of implementing a training module (e.g., data handling and governance platform) that may be accessible to a subscriber of a data handling and governance service may allow one or more target subscribers to the data handling and data governance service an ability to extend, customize, or fine-tune a predictive capability or model performance of one or more of the above-mentioned machine learning models (e.g., one or more pre-trained subscriber-agnostic digital content classification models) of the data handling and governance service.

2.20 Receiving (Sourcing) Raw Training Samples| Connecting Data Sources

S220, which includes receiving (sourcing) raw training samples, may function to receive or source a plurality of distinct raw training data samples associated with a training objective based on or informed by training data sourcing parameters provided by S210. In one or more embodiments, a training objective of a subscriber may control the type of raw training data samples that the training module may receive and/or source. It shall be noted that, in some embodiments, S220 may function to receive (source) training samples, as described in U.S. patent application Ser. No. 17/968,929, filed on 19 Oct. 2022, titled SYSTEMS AND METHODS FOR AUTOMATICALLY SOURCING CORPORA OF TRAINING AND TESTING DATA SAMPLES FOR TRAINING AND TESTING A MACHINE LEARNING MODEL, which is incorporated herein in its entirety by this reference.

In one or more embodiments, a training data curation/ sourcing module (or stage) of a training module (e.g., data handling and governance platform) may function to receive or source document training data samples and/or image training data samples from one or more internal (subscriber) data sources and/or one or more external (third-party) data sources, as described in more detail below.

File Upload of Training Data Samples

Figure 10:
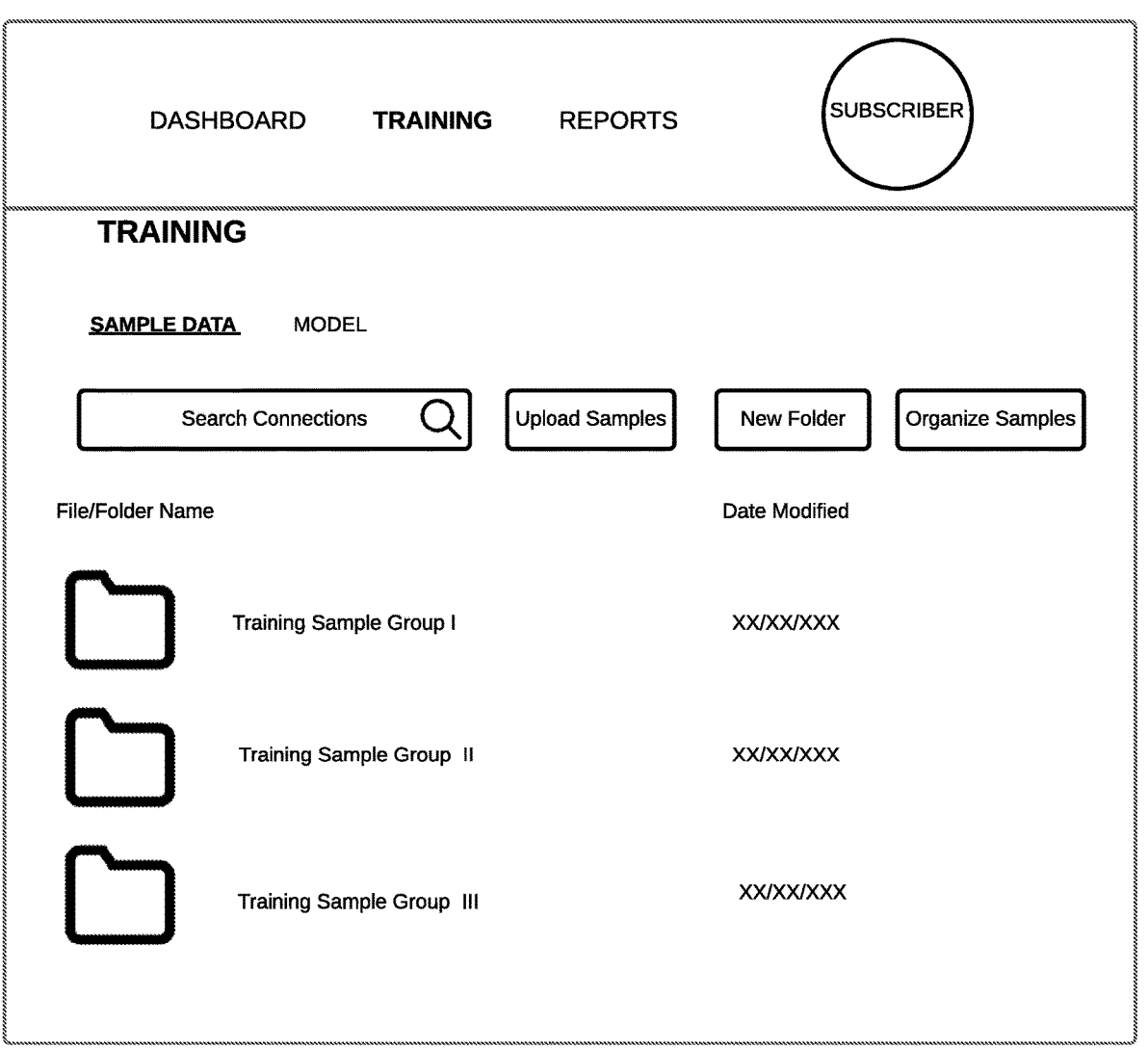
FIG. 10 illustrates an example representation of a training data curation interface of a training module in accordance with one or more embodiments of the present application.

In one or more embodiments, S220 may function to receive a plurality of distinct training data samples in response to a target subscriber uploading one or more training documents (or training files) comprising a plurality of training document samples and/or training image samples via the subscriber interface of the training module, as shown generally by way of example in FIG. 10. In other words, S220 may function to receive a plurality of training data samples in response to a target subscriber uploading one or more training documents (or training files) from a computer workstation of a subscriber to the training module (e.g., data handling and governance platform).

Additionally, or alternatively, in some embodiments, S220 may function to receive a plurality of training data samples in response to a target subscriber establishing a connection stream to a cloud document repository (e.g., Dropbox, SharePoint, etc.).

Document-Image Generator

In another embodiment, S220 may function to implement a document-image generator that may include a document or imaging sourcing interface that may be in operable communication with a plurality of distinct external (third-party) data sources for retrieving and/or sourcing document or image training data samples. In other words, the document-image generator may have programmatic, web, and/or internet-based access to each of the plurality of distinct external data sources of document data and may selectively provide a request for document data to a subset or all the distinct external sources based on the sourcing parameters of the request as further described in U.S. Patent Application 63/257,376, filed on 19 Oct. 2021, titled SYSTEMS AND METHODS FOR AUTOMATICALLY SOURCING CORPORA OF TRAINING AND TESTING DATA SAMPLES FOR TRAINING AND TESTING A MACHINE LEARNING MODEL, which is incorporated herein in its entirety by this reference.

Receiving Training Data Samples in Low Model Confidence Areas

In one or more embodiments, S220 may function to receive a plurality of distinct training data samples (using one or more of the above-mentioned data sourcing methods) in digital content classification areas where a target incumbent model or a subscriber-agnostic digital content machine learning classification model may have low predictive confidence (e.g., below a confidence threshold). In other words, S220 may function to receive a plurality of document training data samples and/or a plurality of image training data samples based on identifying one or more predicative deficiency areas of a target incumbent model operating at or below a confidence level threshold, as described in more detail in S250.

For instance, in a non-limiting example, an incumbent model (e.g., a subscriber-agnostic digital content machine learning classifier) may be predicting one or more document types (e.g., resume documents, invoice documents, etc.) below a confidence threshold (e.g., below ninety (90) percent, below eighty (8o) percent, etc.) and S220 may function to automatically source and/or receive a plurality of training data samples (e.g., resume documents, invoice documents, etc.) associated with such areas where the incumbent model may have low predicative confidence.

Receiving Training Samples Based on a Triggering Event

In one or more embodiments, S220 may function to receive a plurality of document training samples and/or a plurality of image training samples (using one or more of the above-mentioned data sourcing methods) based on a triggering event. For instance, in a non-limiting example, during a testing of a successor machine learning model or a subscriber-agnostic digital content machine learning classification model, a training module may display target content classification inferences below a confidence threshold to a target subscriber to obtain subscriber input, as will be further described in S250.

In such non-limiting example, a triggering condition that may cause the training module to receive a plurality of training data samples may be a subscriber disagreeing (e.g., thumbs down, incorrect, or the like) with a labeling or content classification inference of a target document during a model testing or inference, and in response to such label dispute or inference misalignment between the subscriber and a subject machine learning-based classification model, S220 may function to receive or source additional training data samples that relate to a ground truth document type of the target document.

Stated another way, in one or more embodiments, S220 may function to perform a model validation of a subscriber-agnostic digital content machine learning-based classification model, or a subscriber-specific digital content machine learning-classification model based on one or more testing corpora of subscriber-specific digital content items. Accordingly, in such embodiments, S220 may function to surface, based on the model validation, one or more content classification inferences that may include a content classification label computed by the subscriber-agnostic digital content machine learning-based classification model, or the subscriber-specific digital content machine learning-classification model for each of the one or more content classification inferences and surface a representation of the digital content item that corresponds to a subject content classification inference of the one or more content classification inferences, as shown generally by way of example in FIG. 14.

In one or more embodiments, based on the surfacing, the system or service implementing the method 200 may function to receiving a content classification re-labeling request from the target subscriber to re-label a subject digital content item from the content classification label computed by the subscriber-agnostic digital content machine learning-based classification model, or the subscriber-specific digital content machine learning-classification model to a target content classification label. It shall be noted that, in one or more embodiments, S220 may function to automatically source, based on the target content classification label, a plurality of distinct training data samples that corresponds or relates to the target content classification label using a training data search engine or the like.

In another non-limiting example of a triggering condition that may cause the training module to receive a plurality of training data samples may be a subscriber supporting a classification labeling inference of a target document (e.g., thumbs up, correct) computed by a subject digital content machine learning classification model, and in response to such label alignment, S220 may function to receive (source) additional training data samples associated with the target document type in analogous ways as described above.

Receiving Training Samples Based on Sourcing Parameters/Training Objective

In one or more embodiments, S220 may function to receive a plurality of document training data samples and/or a plurality of image training data samples (using one of the above-mentioned data sourcing methods) based on sourcing parameters and/or a subscriber training objective. For instance, in a non-limiting example, a subscriber training objective may be to train one or more incumbent models (e.g., a subscriber-agnostic machine learning document classifier, etc.) to detect "X" type of document, wherein an "X" type of document may be defined by the subscriber. Thus, S220 may function to receive a plurality of training samples associated with the "X" type of document. It shall be noted, in one or more embodiments, the one or more incumbent models (e.g., subscriber-agnostic digital content machine learning classification models or the like) may not yet be trained to classify inbound digital content items into "X" type of document.

At least one technical benefit of receiving raw training samples will become readily apparent in subsequent steps (e.g., S230-S260).

2.30 Labeling and Routing Raw Training Samples

S230, which includes labeling and routing raw training data samples, may function to label each of a plurality of distinct training data samples received (sourced) by S22o and route each labeled training data sample to a target data corpus. In one or more embodiments, S230 may include providing and/or appending one or more corresponding content classification labels to each distinct document training data sample and/or each distinct image training data sample received or sourced by S220 and route each labeled training data sample to a target data corpus. It shall be noted that, in some embodiments, S230 may function to label and/or annotate training data samples, as described in U.S. Patent Application 63/257,376, filed on 19 Oct. 2021, titled SYSTEMS AND METHODS FOR AUTOMATICALLY SOURCING CORPORA OF TRAINING AND TESTING DATA SAMPLES FOR TRAINING AND TESTING A MACHINE LEARNING MODEL, which is incorporated herein in its entirety by this reference.

In one or more embodiments, S230 may function to compute, determine, and/or assign one or more distinct classification labels to each distinct training data sample provided by S220. That is, in one or more embodiment, S230 may function to determine or attribute a content category classification label and optionally one or more sub-category classification labels for each of the one or more distinct training data samples of one or more corpora of raw training data samples. For instance, in a non-limiting example, S230 may function to determine or compute a first category classification label of "resume" for a plurality of training data samples and further determine that a first subset of the plurality of training samples may be of a first sub-category classification of "marketing" and a second subset of the plurality of training samples may be of a second sub-category classification of "finance". Thereby, classify or label the first subset of training data samples as marketing resumes and the second subset of training samples as finance resumes.

Semi-Automatic Labeling of Training Data Samples Through a Subscriber Interface of the Training Module In one or more embodiments of a first implementation, S230 may function to semi-automatically label one or more training data samples of a plurality of training data samples received by S220 based on detecting one or more labeling inputs from a subscriber via the subscriber interface of the training module (e.g., data handling and governance platform). In such embodiments, a subscriber may identify or have previously identified a target incumbent model (e.g., target subscriber-agnostic digital content machine learning classification model or the like) for re-training, and in response to or based on such identification, the training module may display to the subscriber a set of available labels/annotations associated with the target incumbent model identified for re-training. Accordingly, a subscriber, via the subscriber interface of the training module, may function to automatically map or link a selective subset or each of the plurality of raw training data samples provided by S220 to one or more of the available associated labels/annotations of the target incumbent model identified for training.

Accordingly, in embodiments in which a preferred label/annotation may not be available or applicable in the set of annotations/labels of the target incumbent model, a subscriber, via the subscriber interface, may function to create, via the training module, a new content label category or new content classification field and map a subset or each of the plurality of training samples to the newly created content label category or the new content classification field.

It shall be noted that, in one or more embodiments, the system or service implementing the method 200 may function to identify a target subscriber-agnostic digital content machine learning classification model of the plurality of distinct subscriber-agnostic digital content machine learning classification models based on receiving, via the data handling and governance platform, an input from the target subscriber selecting a distinct selectable representation of a plurality of distinct selectable representations that corresponds to the target subscriber-agnostic digital content machine learning classification model, as shown generally by way of example in FIG. 11.

It shall be further noted, in one or more embodiments, based on identifying the target subscriber-agnostic digital content machine learning classification model, S230 may function to display, via the data handling and governance platform, a model adaptation user interface that may correspond to or may be associated with the target subscriber-agnostic digital content machine learning classification model. In such embodiments, the model adaptation user interface may include a digital representation of the target subscriber-agnostic digital content machine learning classification model, a digital representation of at least one training corpus associated with the target subscriber-agnostic digital content machine learning classification model, a first selectable object that, when selected, enables the target subscriber to add one or more distinct subscriber-informed digital content types to the at least one training corpus, and/or a second selectable object that, when selected, executes a training of the target subscriber-agnostic digital content machine learning classification model with the at least one training corpus, as shown generally by way of example in FIG. 12.

Figure 12:
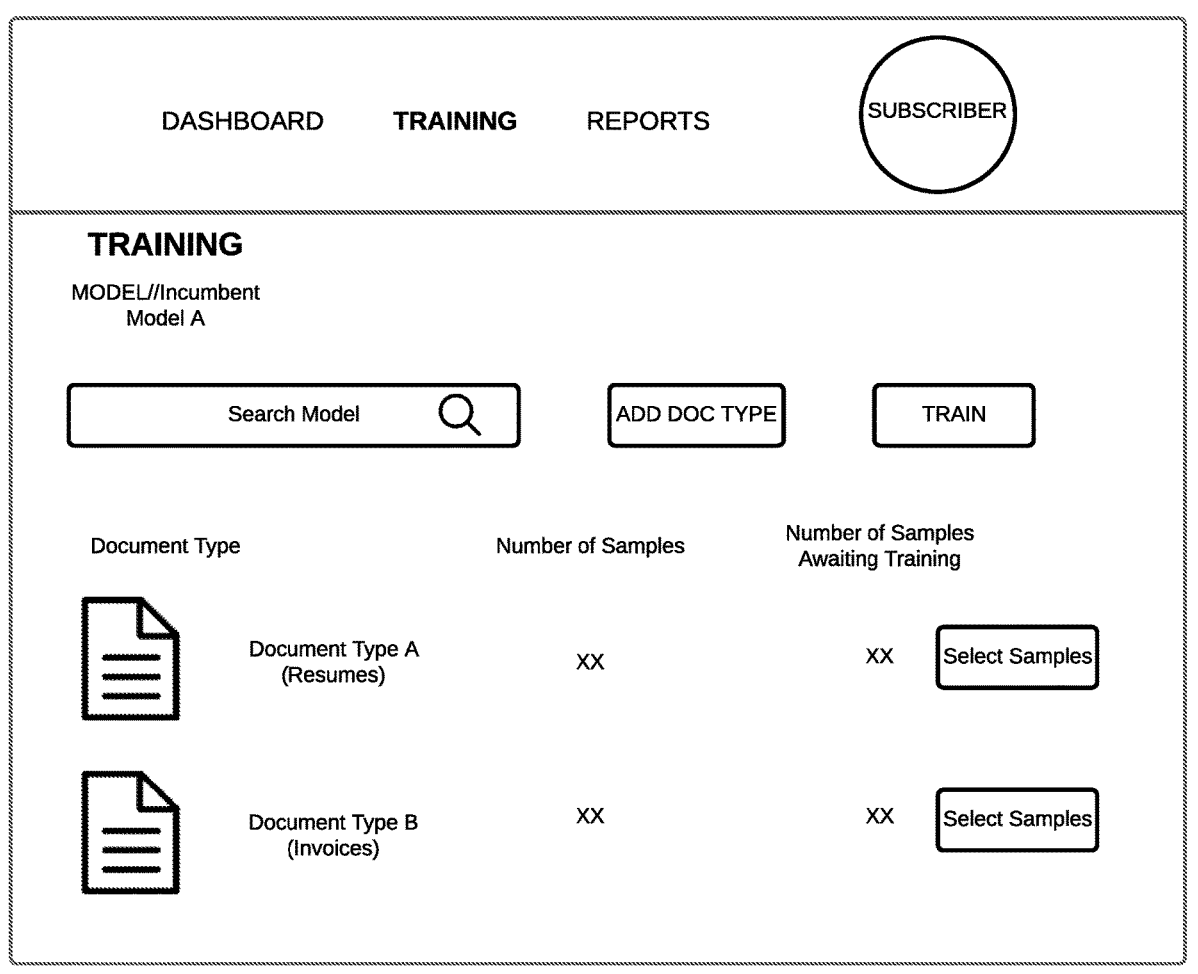
FIG. 12 illustrates an example representation of a training interface of a machine learning training module in accordance with one or more embodiments of the present application.

Accordingly, based on obtaining an input from the target subscriber selecting the first selectable object of the model adaptation user interface associated with the target subscriber-agnostic digital content machine learning classification model, S230 may function to augment a corpus structure of the at least one training corpus to include one or more additional distinct subscriber-informed digital content classification types or categories and digitally map, via the model adaptation user interface, a plurality of distinct items of digital content provided by S220 or the like to each of the one or more additional distinct subscriber-informed digital content classification types or categories, as shown generally by way of example in FIG. 12.

It shall be noted that, via the data handling and governance platform, S230 may function to function to augment a corpus structure of a subject training corpus by deleting or removing from the subject training corpus one or more distinct subscriber-informed digital content classification categories or one or more subscriber-agnostic digital content classification categories.

Automatic Labeling of Training Data Samples

In one or more embodiments of a second implementation, S230 may function to automatically label each distinct training data sample of the plurality of training samples provided by S220 through an automated labeling technique. In such embodiments, S230 may function to implement one or more automated labeling techniques that may include, but not limited to, pattern-matching based labeling, clustering-based labeling, and/or using a labeling layer having human-in-the-loop labeling/annotations.

Routing of Training Data Samples

In one or more embodiments, based on or in response to labeling one or more training data samples, S230 may function to pass each of the one or more labeled documents or images to one of an in-scope corpus or an out-of-scope corpus, as shown generally by way of example in FIG. 8. An in-scope training sample of an in-scope corpus, as referred to herein, preferably relates to a training sample that may have been provided a classification label that matches a target category or type, such as a category provided with document sourcing parameters or an intended category of a training objective for training an incumbent model on a distinct (e.g., subscriber-specific) classification task. An out-of-scope training sample of an out-of-scope corpus, as referred to herein, preferably relates to a training sample that may have been provided a classification label that does not match a target category of a training objective.

Accordingly, S230 may function to create or build a first corpus of labeled data samples that may be in-scope and a second corpus of labeled data samples that may be out-of-scope. In such embodiments, the in-scope corpus may be used for testing and/or training and the out-of-scope corpus may be used for testing of a subject digital content machine learning classification model.

Alternatively, in another implementation, S230 may function to automatically route each in-scope training sample to one or more training corpora previously or originally used to train the target incumbent model (or subject-agnostic digital content machine learning classification model) of the data handling and governance service. In such implementations, one or more incumbent models of the data handling and governance service may be mapped or linked to one or more pre-existing training corpora and in accordance with a determination that a training sample may be in-scope, S230 may function to route the in-scope training sample to the one or more pre-existing training corpora that may have been previously or originally used during a training of the target incumbent model (e.g., subject-agnostic digital content machine learning classification model).

2.40 Generating a Successor Digital Content Machine Learning Classification Model to an Incumbent Model of a Data Handling and Governance Service S240, which includes generating a successor model, may function to generate a successor (machine learning) model that may extend on at least one capability of a target incumbent (machine learning) model of a data handling and governance service. Generating a successor machine learning model may include re-training a subscriber-agnostic incumbent model or a previously generated subscriber-specific incumbent model with subsets of labeled data samples from the in-scope training corpus, the augmented pre-existing training corpus having the in-scope training samples, or the like. It shall be noted that the phrase "successor model" may be interchangeably referred to herein as a "subscriber-specific digital content machine learning classification model."

In one or more embodiments, a system (e.g., the system 100) or a service implementing the method 200 may receive a request from a subscriber, via the subscriber interface, to generate a successor model to a target incumbent model that may expand on a model performance or capability metric that surpasses a current capability of the target incumbent model of the data handling and governance service.

In one or more embodiments, S240 may function to display, on a graphical user interface of the data handling and governance platform, a distinct selectable representation corresponding to each of the plurality of distinct subscriber-agnostic digital content machine learning classification models. Accordingly, S240 may function to identify a target subscriber-agnostic digital content machine learning classification model of the plurality of distinct subscriber-agnostic digital content machine learning classification models based on receiving, via the data handling and governance platform, an input from the target subscriber selecting the distinct selectable representation that corresponds to the target subscriber-agnostic digital content machine learning classification model, as shown generally by way of example in FIG. 11.

In one or more embodiments, a successor (machine learning) model to a target incumbent (machine learning) model may take a variety of forms. For instance, in one non-limiting example, a successor (machine learning) model may be generated based on training a target subscriber-agnostic incumbent model of a data handling and governance service with subscriber-curated training data (e.g., a subscriber-specific training corpus). In another example, a successor (machine learning) model may be generated by re-training a subscriber-specific incumbent model according to a new or revised training objective.

For instance, in a non-limiting example, a target subscriber-agnostic digital content machine learning classification model may be configured to classify a target piece of digital content into one or more of a plurality of distinct subscriber-agnostic digital content types. In the same non-limiting example, a subscriber-specific digital content machine learning classification model may be configured to classify a subject piece of digital content into one or more of the plurality of distinct subscriber-agnostic digital content types and the subscriber-specific digital content type based on a model training of the target subscriber-agnostic digital content machine learning classification model with one or more (model extending) training corpora of subscriber-specific training data samples that may include a plurality of distinct labeled training data samples that correspond to the subscriber-specific digital content type that is distinct from the plurality of distinct subscriber-agnostic digital content types.

It shall be noted that, in one or more embodiments, before generating a successor model (e.g., subscriber-specific digital content machine learning classification model), S240 may function to test a target incumbent model on a corpus of test data. In such embodiments, S240 may function to determine whether a training is needed to satisfy a training objective of the subscriber before initiating a training flow. Additionally, or alternatively, S240 may function to test a target incumbent model on a corpus of test data to compute one or more incumbent model performance metrics (e.g., a model accuracy) to compare with a performance of a successor model after training to track model improvements.

In one or more embodiments, S240 may function to perform a model validation of a subject subscriber-agnostic digital content machine learning classification model based on one or more testing corpora of subscriber-specific testing data samples and compute one or more validation efficacy metrics based on a result of the model validation of the subject subscriber-agnostic digital content machine learning classification model. In operation, S240 may function to adapt the subject subscriber-agnostic digital content machine learning classification model to a subscriber-specific digital content machine learning classification model via a model training based on an assessment that the one or more validation efficacy metrics does not satisfy one or more efficacy benchmarks of the subscriber and/or the service.

Figure 13:
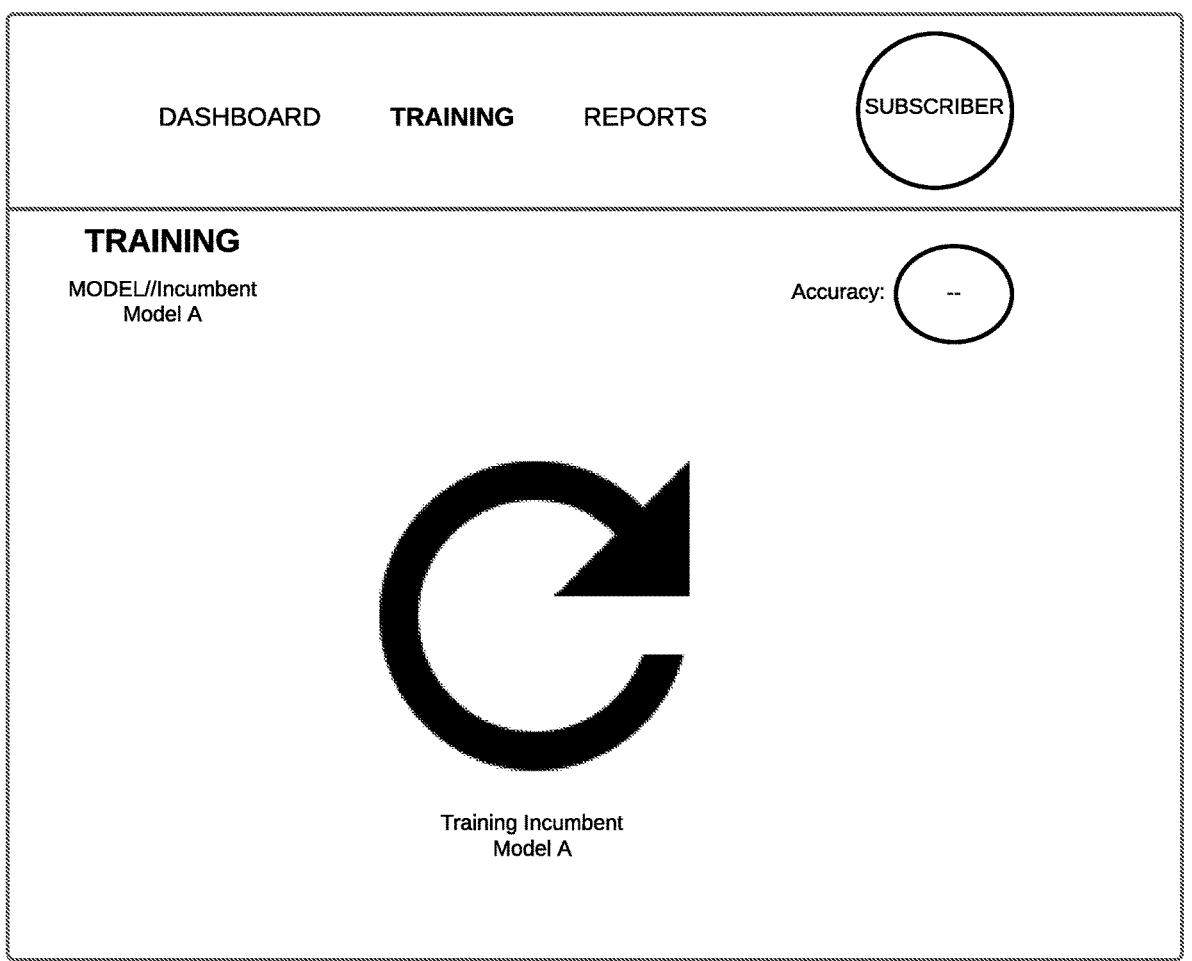
FIG. 13 illustrates an example interface of a machine learning training module actively re-training or training a target incumbent model in accordance with one or more embodiments of the present application.

Accordingly, in one or more embodiments, S240 may function to generate a successor (machine learning-based) model to an incumbent (machine learning-based) model in response to detecting a subscriber training request, via the subscriber interface of the training module, as shown generally by way of example in FIG. 12 and FIG. 13. In other words, a subscriber interacting or interfacing with the subscriber interface of the training module may select an interface object and in response to or based on the detection of such interface object, the training module may function to retrain a target incumbent model (e.g., a target subscriber-agnostic digital content machine learning classification model, etc.) with subsets of labeled samples from the in-scope training corpus or the like.

Accordingly, in some embodiments, in response to receiving a subscriber request to train a target incumbent model (e.g., subscriber-agnostic digital content machine learning classification model or the like), S240 may function to automatically select a training corpus (e.g., the in-scope corpus, the augmented pre-existing training corpus including the in-scope training samples, or the like) that may be mapped or linked to the target incumbent model. Alternatively, in some embodiments, in response to receiving a subscriber request to train a target incumbent model, S240 may function to display (via the subscriber interface) a plurality of training corpora for a target subscriber to select for use in a model training for the target incumbent model.

Accordingly, in response to completing a training of one or more target incumbent models (e.g., one or more subscriber-agnostic digital content machine learning classification models or the like) using the in-scope training corpus (or the augmented pre-existing training corpus having in-scope training samples, etc.), the one or more target incumbent models may be trained to predict (e.g., classify) on such type of training data samples of the in-scope training corpus or the augmented pre-existing training corpus and thus, achieving the training objective provided by the subscriber. In other words, S240 may function to adapt the target subscriber-agnostic digital content machine learning classification model to a subscriber-specific digital content machine learning classification model based on the training of the target subscriber-agnostic digital content machine learning classification model. It shall be noted that an algorithmic structure of the subscriber-specific digital content machine learning classification model may be an extension of an algorithmic structure of the target subscriber-agnostic digital content machine learning classification model based on the training.

It shall be noted that, in one or more embodiments, re-training one or more target incumbent models may include using any known supervised learning method. However, in some alternative implementations, S240 may function to retrain one or more target incumbents with any known unsupervised learning method.

2.50 Testing a Successor Model

S250, which includes testing a successor (machine learning-based) model, may function to test and evaluate a successor model generated by S240 using one or more curated corpora of test data samples. In one or more embodiments, a system (e.g., the system 100) or a service implementing the method 200 may receive a request to test or perform a model validation on a successor model (e.g., subscriber-specific digital content machine learning classification model) that may potentially replace an incumbent model (e.g., subscriber-agnostic digital content machine learning classification model) of a data handling and governance service. Testing a successor model, as generally referred to herein, may be a process where a performance of a trained model (e.g., a subscriber-specific digital content machine learning model or the like) is evaluated on one or more corpora of test data samples distinct from one or more corpora of training data samples.

In one or more embodiments, S250 may function to define a test corpus based on labeled data samples sourced from an in-scope corpus and/or labeled data samples sourced from an out-of-scope corpus. The test corpus may include any suitable mix of in-scope and out-of-scope samples that may enable a robust test of a successor model (e.g., subscriber-specific digital content machine learning classification model).

That is, in one or more embodiments, S250 may function to test a successor model (e.g., subscriber-specific digital content machine learning classification model) on a corpus of test document data samples to obtain performance metrics on the successor model after a model training is complete. For instance, in a non-limiting example, S250 may function to compute one or more performance metrics of the successor model, such as an accuracy metric of the successor model, a precision metric of the successor model, or the like. It shall be noted that, one or more of the above-mentioned metrics may be computed globally for the successor model (e.g., for all document types) and/or for each category-specific document type (e.g., resume, invoices, letters, etc.) and may be displayed to the user through the subscriber interface of the training module.

Figure 14:
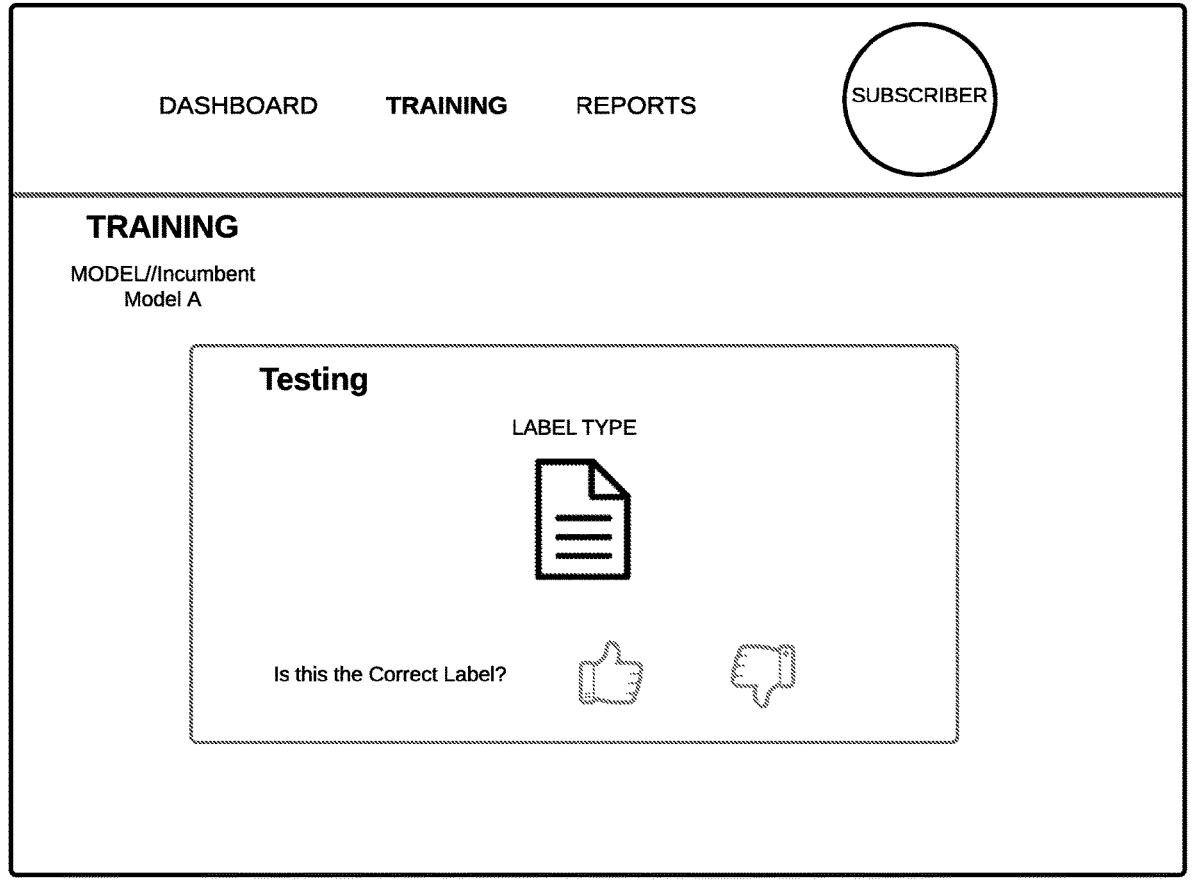
FIG. 14 illustrates an example interface of a machine learning testing module testing a re-trained or trained incumbent model in accordance with one or more embodiments of the present application.

Real-Time or Near Real-Time Display of Digital Content Classification Inferences During Model Validation In some embodiments, during a testing or a model validation of a successor model (e.g., subscriber-specific digital content machine learning classification model), classification inferences computed by a successor model and the corresponding document data sample associated with the classification inference may be displayed to a subscriber, via the subscriber interface to obtain subscriber input or feedback, as shown generally by way of example in FIG. 14. For instance, in a non-limiting example, based on a testing or model validation, S250 may function to display a plurality of distinct content classification inferences computed by a successor model along with the corresponding testing data document to obtain subscriber input on if the computed label inference for the target document was correct or incorrect.

In one or more embodiments, based on an execution of a model validation of a subscriber-specific digital content machine learning classification model, S250 may function to (e.g., sequentially) surface, based on the model validation of the subscriber-specific digital content machine learning classification model, a plurality of distinct content classification inferences that includes a content classification label computed by the subscriber-specific digital content machine learning classification model and a distinct representation of a digital content item to which the content classification inference of the plurality of distinct content classification inferences corresponds.

In one or more embodiments, S250 may function to display targeted content classification inferences and corresponding target test data documents rather than each content classification inference computed by the subscriber-specific digital content machine learning classification model during testing (e.g., model validation). In such embodiments, S250 may function to display classification inferences computed by a successor model (e.g., subscriber-specific digital content machine learning classification model) below a confidence level threshold (e.g., below a 90% confidence threshold, below an 85% confidence threshold, below an 80% confidence threshold, or the like).

Additionally, in some embodiments, for each surfaced (or displayed) target content classification inference, S250 may optionally provide a plurality of selectable objects that may provide a subscriber an ability to support a content classification inference computed by a successor model (e.g., thumbs up) or disagree with a content classification inference computed by the successor model (e.g., thumbs down). In such embodiments, S250 may function to display a dialogue box or the like that may include a target document, a content classification inference of the target document computed by the successor (machine learning) model, and a plurality of distinct selectable objects that may allow a subscriber an ability to support a predicted classification of a target testing document (e.g., thumbs up) and/or disagree with a predicated classification of a target testing document (e.g., thumbs down).

In one or more embodiments, based on or in response to a subscriber selecting a selectable object disagreeing with a computed content classification inference of a test data document, S250 may function to automatically initiate a ground truth labeling workflow, as described in more detail herein.

Triage Workflow

In one on or more embodiments, an automated ground truth labeling workflow may be executed in response to or based on a subscriber disagreeing (e.g., thumbs down) with a predicated content classification inference/content classification label associated with a test document computed by the successor model. In such embodiments, S250 may function to route the predicted content classification inference/content classification label associated the test document and the corresponding test document to a digital content triage queue.

In one or more embodiments, based on performing a model validation of the subscriber-specific digital content machine learning classification model, S250 may function to route, to a digital content triage queue, a selective subset of distinct content classification inferences computed by the subscriber-specific digital content machine learning classification model during the model validation and a distinct subset of subscriber-specific digital content items corresponding to the subset of distinct content classification inferences. It shall be noted that each distinct content classification inference of the selective subset of distinct content classification inferences may be below an inference confidence threshold.

Stated differently, in one or more embodiments, a triage workflow, when executed, may pass one or more target documents and one or more corresponding content classification inferences to a triage/labeling queue where the subscriber may re-label accordingly, if applicable. In other words, for each content classification inference computed by the successor model during a model testing/validation where the subscriber may disagree with such content classification inference, S250 may function to route each testing document and corresponding inference/classification label to a triage/labeling queue for a re-labeling action by the subscriber.

Accordingly, after the subscriber re-labels one or more testing documents in the triage/labeling queue, S250 may function to subsequently pass the re-labeled testing documents to an in-scope training corpus (e.g., a training corpus or the like) and re-train the successor model with the updated in-scope training corpus (e.g., updated training corpus).

It shall be noted that, in one or more embodiments, the process may be repeated until the successor model may be predicting all content classification inferences above a confidence level threshold.

Instant-Labeling Workflow

In another implementation of an automated ground truth labeling workflow, in response to a subscriber disagreeing with a predicated content classification of a test document or test data sample, S250 may function to subsequently prompt a subscriber for a more appropriate label to re-label the test document or test sample. In other words, for each content classification inference predicted by the successor model that the target subscriber may disagree with, S250 may function to prompt the subscriber for a more appropriate content classification label and in response receiving the subscriber input, S250 may function to remove the previous content classification label and map the subscriber-preferred label to the target document.

Accordingly, after re-labeling of the test document, S250 may function to route the re-labeled test document or sample to the in-scope training corpus (or an updated training corpus) and retrain the successor model with the updated in-scope training corpus (or the updated training corpus).

Stated another way, in one or more embodiments, based on performing a model validation of a subscriber-specific digital content machine learning classification model using one or more testing corpora of subscriber-specific digital content items, S250 may function to (e.g., sequentially) surface, based on the model validation, a subject content classification inference that may include a content classification label computed by the subscriber-specific digital content machine learning classification model and a representation of a digital content item that corresponds to the subject content classification inference. In some embodiments, S250 may function to receive a content classification re-labeling request from the target subscriber to re-label the digital content item from the content classification label to a target content classification label and route the digital content item and the target content classification label to a training corpus associated with the subscriber-specific digital content machine learning classification model that may be used in a model training as described above.

It shall be noted that, in one or more embodiments, the process may be repeated until the successor model may be predicting all inferences above a confidence level threshold.

2.60 Replacing an Incumbent Digital Content Machine Learning Classification Model with a Successor Digital Content Machine Learning Classification Model S260, which includes replacing an incumbent digital content machine learning classification model with a successor digital content machine learning classification model, may function to replace an incumbent digital content machine learning classification model with a successor digital content machine learning classification model based on satisfying a training objective defined or provided by S210. In one or more preferred embodiments, after a training and/or a testing of a successor digital content machine learning classification model (e.g., subscriber-specific digital content machine learning classification model, etc.), S260 may function to replace an incumbent digital content machine learning classification model (e.g. subscriber-agnostic digital content machine learning classification model, etc.) with the successor digital content machine learning classification model after validation that the successor model may be operating at a preferred state (e.g., a preferred state of accuracy or the like).

In a first implementation, S260 may to compute one or more efficacy metrics for a subject subscriber-specific digital content machine learning classification model based on the training and display, via the data handling and governance platform, a training results user interface that may include the one or more efficacy metrics computed for the subscriber-specific digital content machine learning classification model, a first selectable object that, when selected, automatically implements the subscriber-specific digital content machine learning classification model in the production mode of operation for the target subscriber, and a second selectable object that, when selected, forgoes implementing the subscriber-specific digital content machine learning classification model in the production mode of operation for the target subscriber.

Accordingly, in one or more embodiments of the first implementation, S260 may function to implement the subscriber-specific digital content machine learning classification model in a production mode of operation for the target subscriber based on identifying an input from the target subscriber selecting the first selectable object of the training results user interface. Alternatively, in one or more embodiments of the first implementation, S260 may function to forgo implementing the subscriber-specific digital content machine learning classification model in the production mode of operation for the target subscriber based on identifying an input from the target subscriber selecting the second selectable object of the training results user interface.

Figure 15:
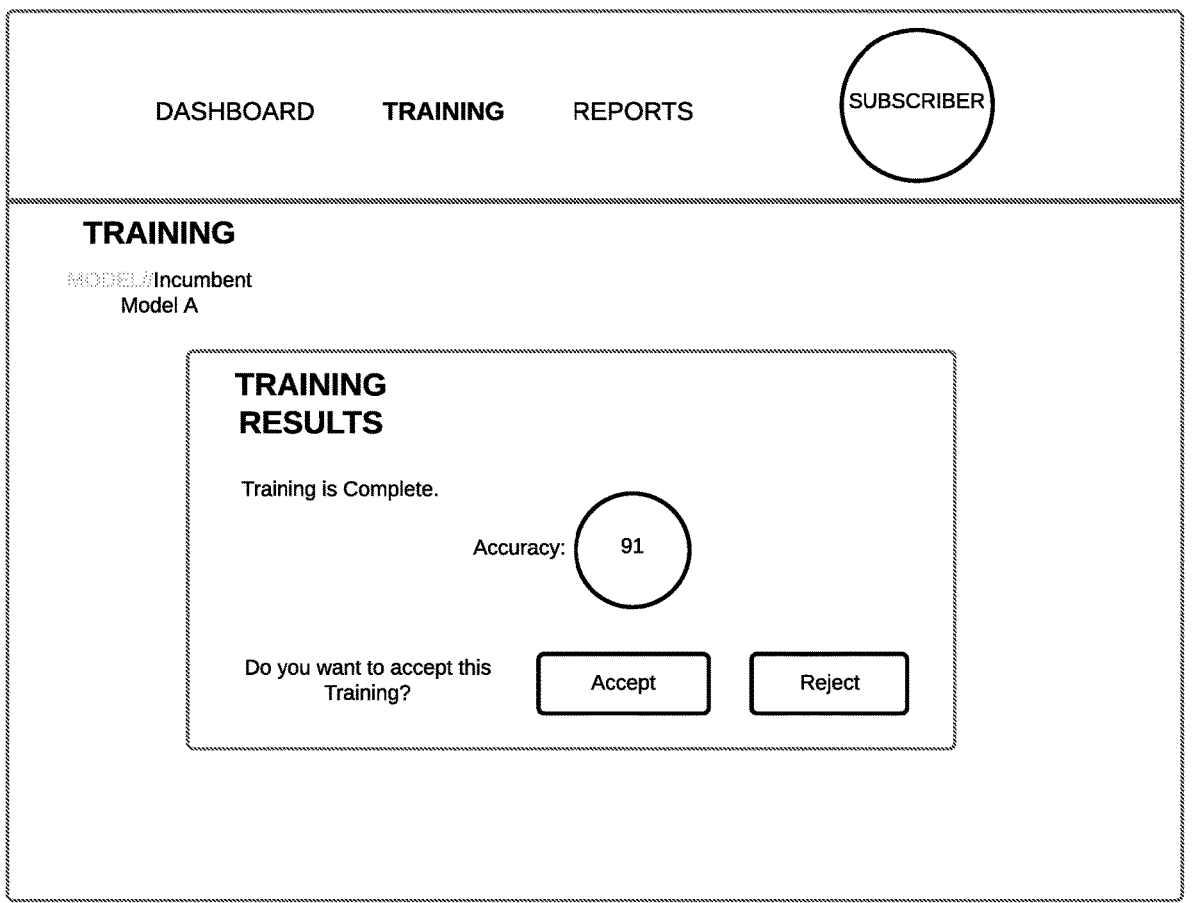
FIG. 15 illustrates an example interface of a machine learning deployment module in accordance with one or more embodiments of the present application.

In a second implementation, S260 may function to replace in incumbent (machine learning-based model) with a successor (machine learning-based) model, in response to detecting a subscriber input or request directed towards interchanging the incumbent model with the successor model, as shown generally by way of example in FIG. 15. In such implementation, based on completing a training and/or a testing of a successor machine learning model, S260 may function to display, via a user interface of the data handling and governance platform, a training results user interface that may include one or more performance metrics associated with the training and/or testing and prompt the subscriber to either accept the training of the successor model or decline the training of successor model. Accordingly, in response to the subscriber accepting the training of the successor model or declining the training of the successor mode, S260 may function to either replace the incumbent model with the successor model or maintain use of the current production-implemented incumbent model.

In one or more embodiments, S260 may function to deploy or replace an incumbent model based on an update or replacement schedule. For instance, in a non-limiting example, S260 may function to operate the successor model in parallel or simultaneously with the incumbent model for a period of time. In such implementation, the successor model may be receiving equivalent or the same model inputs as the incumbent model, however, the successor model may be operating in a shadow mode in which the predicted model outputs are computed but not exposed (live) to the subscriber. Accordingly, in accordance with a determination, that a performance metric and/or a capability of the successor model may be better than the production-implemented incumbent model, S260 may function to replace the production-implemented incumbent model with the successor model.

It shall be noted that replacing a production-implemented incumbent model of the data handling and governance service with a successor model for a target subscriber may lead to only modifying the data handling and governance for the target subscriber rather than a universal change across all subscribers of the data handling and governance service.

Content Classification Inferences in Production

In one or more embodiments, based on implementing the subscriber-specific digital content machine learning classification model in a production mode of operation for the target subscriber, the subscriber-specific digital content machine learning classification model may operate in concert with a subset of the plurality of distinct subscriber-agnostic digital content machine learning classification models to compute one or more distinct content classification inferences (e.g., classification labels) for inbound digital content items.

It shall be noted that, in one or more embodiments, a subscriber may disagree with a subset of the distinct content classification inferences/labels computed by the subscriber-specific digital content machine learning classification model for the inbound digital content items. Accordingly, the disputed or disagreed with content classification inferences/labels and the corresponding digital content items may be routed to the above-mentioned digital content triage queue for ground truth labeling and may be used in a model training for improving the predicative accuracy of the subscriber-specific digital content machine learning classification model.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A computer-implemented system accelerating an adaptation of one or more production-implemented machine learning models of a data handling and governance service, the system comprising:

one or more processors;

a memory; and a computer-readable medium operably coupled to the one or more processors, the computer-readable medium having computer-readable instructions stored thereon that, when executed by the one or more processors, cause a computing device to perform operations comprising:

implementing a data handling and governance platform digitally accessible by a target subscriber of the data handling and governance service, wherein the data handling and governance platform:

(1) interfaces with a plurality of distinct pre-trained subscriber-agnostic digital content machine learning classification models of the data handling and governance service, and (2) enables the target subscriber a capability of adapting each of the plurality of distinct pre-trained subscriber-agnostic digital content machine learning classification models;

selecting a target pre-trained subscriber-agnostic digital content machine learning classification model of the plurality of distinct pre-trained subscriber-agnostic digital content machine learning classification models based on receiving, via the data handling and governance platform, an input from the target subscriber that corresponds to the target pre-trained subscriber-agnostic digital content machine learning classification model;

defining an adaptation corpus of subscriber-specific training data samples based on sourcing a plurality of distinct subscriber-specific items of digital content;

adapting the target pre-trained subscriber-agnostic digital content machine learning classification model to a subscriber-specific digital content machine learning classification model based on a training of the target pre-trained subscriber-agnostic digital content machine learning classification model with at least one training corpus comprising subscriber-specific training data samples;

replacing the target pre-trained subscriber-agnostic digital content machine learning classification model with the subscriber-specific digital content machine learning classification model based on one or more efficacy metrics computed for the subscriber-specific digital content machine learning classification model satisfying one or more model efficacy thresholds; and implementing the subscriber-specific digital content machine learning classification model in a production mode of operation for the target subscriber.

2. The system according to claim 1, wherein:

the subscriber-specific digital content machine learning classification model operates in concert with a subset of a plurality of distinct subscriber-agnostic digital content machine learning classification models to compute one or more distinct classification inferences for a corpus of unlabeled digital content items.

3. The system according to claim 1, wherein:

the target pre-trained subscriber-agnostic digital content machine learning classification model is configured to classify a target piece of digital content into one of a plurality of pre-trained subscriber-agnostic digital content types based on input of feature data extracted from the target piece of digital content;

the adaptation corpus of subscriber-specific training data samples includes a plurality of distinct labeled training data samples that correspond to a subscriber-specific digital content type distinct from the plurality of pre-trained subscriber-agnostic digital content types; and the subscriber-specific digital content machine learning classification model is configured to classify a subject piece of digital content into one of the plurality of pre-trained subscriber-agnostic digital content types and the subscriber-specific digital content type.

4. The system according to claim 1, wherein:

the data handling and governance platform is an intermediary between the target subscriber and the data handling and governance service that enables the target subscriber a capability of controlling each of the plurality of pre-trained subscriber-agnostic digital content machine learning classification models of the data handling and governance platform.

5. The system according to claim 1, wherein:

an algorithmic structure of the subscriber-specific digital content machine learning classification model is an extension of an algorithmic structure of the target pre-trained subscriber-agnostic digital content machine learning classification model based on the training.

6. The system according to claim 1, further comprising:

performing a model validation of the subscriber-specific digital content machine learning classification model based on one or more testing corpora of subscriber-specific digital content items;

surfacing, based on the model validation of the subscriber-specific digital content machine learning classification model, (a) a content classification inference that includes a content classification label computed by the subscriber-specific digital content machine learning classification model and (b) a representation of one of the subscriber-specific digital content items of the one or more testing corpora of subscriber-specific digital content items that corresponds to the content classification inference;

receiving a content classification re-labeling request from the target subscriber to re-label the one of the subscriber-specific digital content items from the content classification label to a target content classification label; and routing the one of the subscriber-specific digital content items and the target content classification label to a training corpus associated with the subscriber-specific digital content machine learning classification model.

7. The system according to claim 6, further comprising:

Automatically sourcing, via a training data search engine, a plurality of distinct training data samples based on the target content classification label;

routing the plurality of distinct training data samples to the training corpus associated with the subscriber-specific digital content machine learning classification model; and performing a training of the subscriber-specific digital content machine learning classification model based on the training corpus.

8. The system according to claim 1, further comprising:

performing a model validation of the subscriber-specific digital content machine learning classification model based on one or more testing corpora of subscriber-specific digital content items;

routing, to a digital content triage queue, (a) a subset of distinct content classification inferences computed by the subscriber-specific digital content machine learning classification model during the model validation and (b) a distinct subset of subscriber-specific digital content items of the one or more testing corpora of subscriber-specific digital content items that correspond to the subset of distinct content classification inferences; and wherein each distinct content classification inference of the subset of distinct content classification inferences is below an inference confidence threshold.

9. The system according to claim 1, further comprising:

generating one or more testing corpora of subscriber-specific testing data samples based on a subset of the adaptation corpus of subscriber-specific training data samples;

performing a model validation of the target pre-trained subscriber-agnostic digital content machine learning classification model based on the one or more testing corpora of subscriber-specific testing data samples;

computing one or more validation efficacy metrics based on a result of the model validation of the target pre-trained subscriber-agnostic digital content machine learning classification model; and wherein transforming the target pre-trained subscriber-agnostic digital content machine learning classification model to a subscriber-specific digital content machine learning classification model is further based on an assessment of the one or more validation efficacy metrics against the one or more model efficacy thresholds.

10. A method accelerating an adaptation of a plurality of pre-trained machine learning models of a data handling and governance service, the method comprising:

implementing a data handling and governance platform digitally accessible by a target subscriber of the data handling and governance service, wherein the data handling and governance platform:

(1) interfaces with a plurality of distinct pre-trained subscriber-agnostic digital content machine learning classification models of the data handling and governance service, and (2) enables the target subscriber a capability of adapting each of the plurality of distinct pre-trained subscriber-agnostic digital content machine learning classification models;

selecting a target pre-trained subscriber-agnostic digital content machine learning classification model of the plurality of distinct pre-trained subscriber-agnostic digital content machine learning classification models based on receiving, via the data handling and governance platform, an input from the target subscriber that corresponds to the target pre-trained subscriber-agnostic digital content machine learning classification model;

defining an adaptation corpus of subscriber-specific training data samples based on sourcing a plurality of distinct subscriber-specific items of digital content;

adapting the target pre-trained subscriber-agnostic digital content machine learning classification model to a subscriber-specific digital content machine learning classification model based on a training of the target pre-trained subscriber-agnostic digital content machine learning classification model with at least one training corpus comprising subscriber-specific training data samples;

replacing the target pre-trained subscriber-agnostic digital content machine learning classification model with the subscriber-specific digital content machine learning classification model based on one or more efficacy metrics computed for the subscriber-specific digital content machine learning classification model satisfying one or more model efficacy thresholds; and implementing the subscriber-specific digital content machine learning classification model in a production mode of operation for the target subscriber.

11. The method according to claim 10, further comprising:

displaying, on a graphical user interface of the data handling and governance platform, a distinct selectable representation corresponding to each of the plurality of distinct pre-trained subscriber-agnostic digital content machine learning classification models; and wherein:

the input from the target subscriber relates to the target subscriber selecting the distinct selectable representation that corresponds to the target pre-trained subscriber-agnostic digital content machine learning classification model.

12. The method according to claim 10, further comprising:

in response to the identifying of the target pre-trained subscriber-agnostic digital content machine learning classification model:

displaying, via the data handling and governance platform, a model adaptation user interface that corresponds to the target pre-trained subscriber-agnostic digital content machine learning classification model, wherein the model adaptation interface includes:

(a) a digital representation of the target pre-trained subscriber-agnostic digital content machine learning classification model;

(b) a digital representation of the at least one training corpus associated with the target pre-trained subscriber-agnostic digital content machine learning classification model;

(c) a first selectable object that, when selected, enables the target subscriber to add one or more distinct subscriber-informed digital content types to the at least one training corpus; and (d) a second selectable object that, when selected, executes the training of the target pre-trained subscriber-agnostic digital content machine learning classification model with the at least one training corpus.

13. The method according to claim 12, further comprising:

based on obtaining an input from the target subscriber selecting the first selectable object of the model adaptation user interface, augmenting a corpus structure of the at least one training corpus to include a distinct subscriber-informed digital content type; and digitally mapping, via the model adaptation user interface, a plurality of distinct items of digital content of the target subscriber to the distinct subscriber-informed digital content type.

14. The method according to claim 13, wherein:

the target pre-trained subscriber-agnostic digital content machine learning classification model is configured to classify a target piece of digital content into one or more pre-trained subscriber-agnostic digital content types based on feature data extracted from the target piece of digital content;

the method further includes:

based on obtaining an input from the target subscriber selecting the second selectable object of the model adaptation user interface, executing the training of the target pre-trained subscriber-agnostic digital content machine learning classification model with the at least one training corpus comprising the distinct subscriber-informed digital content type and the plurality of distinct items of digital content of the target subscriber digitally mapped to the distinct subscriber-informed digital content type, wherein:

the subscriber-specific digital content machine learning classification model is configured to classify a subject piece of digital content into one or more of the one or more pre-trained subscriber-agnostic digital content types and the distinct subscriber-informed digital content type based on the training.

15. The method according to claim 10, further comprising:

computing one or more efficacy metrics for the subscriber-specific digital content machine learning classification model based on the training;

displaying, on a graphical user interface, a training results user interface that includes:

(a) the one or more efficacy metrics computed for the subscriber-specific digital content machine learning classification model;

(b) a first selectable object that, when selected, automatically implements the subscriber-specific digital content machine learning classification model in the production mode of operation for the target subscriber; and (c) a second selectable object that, when selected, forgoes implementing the subscriber-specific digital content machine learning classification model in the production mode of operation for the target subscriber.

16. The method according to claim 15, wherein:

implementing the subscriber-specific digital content machine learning classification model in the production mode of operation for the target subscriber is based on identifying an input from the target subscriber selecting the first selectable object of the training results user interface.

17. A computer-program product comprising a non-transitory machine-readable storage medium storing computer instructions that, when executed by one or more processors, perform operations comprising:

implementing one or more operations of a data handling and governance platform digitally accessible by a target subscriber of the data handling and governance service, wherein the data handling and governance platform:

(1) interfaces with a plurality of distinct pre-trained subscriber-agnostic digital content machine learning classification models of the data handling and governance service, and (2) enables the target subscriber a capability of adapting each of the plurality of distinct pre-trained subscriber-agnostic digital content machine learning classification models;

selecting a target pre-trained subscriber-agnostic digital content machine learning classification model of the plurality of distinct pre-trained subscriber-agnostic digital content machine learning classification models based on receiving, via the data handling and governance platform, an input from the target subscriber that corresponds to the target pre-trained subscriber-agnostic digital content machine learning classification model;

defining an adaptation corpus of subscriber-specific training data samples based on sourcing a plurality of distinct subscriber-specific items of digital content;

adapting the target pre-trained subscriber-agnostic digital content machine learning classification model to a subscriber-specific digital content machine learning classification model based on a training of the target pre-trained subscriber-agnostic digital content machine learning classification model with at least one training corpus comprising subscriber-specific training data samples;

replacing the target pre-trained subscriber-agnostic digital content machine learning classification model with the subscriber-specific digital content machine learning classification model based on one or more efficacy metrics computed for the subscriber-specific digital content machine learning classification model satisfying one or more model efficacy thresholds; and implementing the subscriber-specific digital content machine learning classification model in a production mode of operation for the target subscriber.

18. The computer-program product according to claim 17, further comprising:

implementing the subscriber-specific digital content machine learning classification model in a production mode of operation for the target subscriber, wherein:

the subscriber-specific digital content machine learning classification model operates in concert with a subset of the plurality of distinct pre-trained subscriber-agnostic digital content machine learning classification models to compute one or more distinct classification inferences for a corpus of unlabeled digital content items.

19. The computer-program product according to claim 17, wherein:

the data handling and governance platform is an intermediary between the target subscriber and the data handling and governance service that enables the target subscriber a capability of controlling each of the plurality of distinct pre-trained subscriber-agnostic digital content machine learning classification models of the data handling and governance platform.

20. The computer-program product according to claim 17, further comprising:

sourcing a plurality of distinct adaptation corpora of subscriber-specific training data samples;

assigning each distinct adaptation corpus of the plurality of distinct adaptation corpora to a training of a distinct subscriber-agnostic model of the plurality of distinct pre-trained subscriber-agnostic digital content machine learning classification models, wherein each of the plurality of distinct pre-trained subscriber-agnostic digital content machine learning classification models produces a distinct content classification inference; and transforming each distinct subscriber-agnostic model to a distinct subscriber-specific model based on executing the training of each distinct subscriber-agnostic model.

* * * * *